(12) United States Patent  
Brown Elliott et al.

(10) Patent No.: US 7,525,526 B2
(45) Date of Patent: **\*Apr. 28, 2009**

(54) SYSTEM AND METHOD FOR PERFORMING IMAGE RECONSTRUCTION AND SUBPIXEL RENDERING TO EFFECT SCALING FOR MULTI-MODE DISPLAY

(75) Inventors: Candice Hellen Brown Elliott, Vallejo, CA (US); Michael Francis Higgins, Cazadaro, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 290 days.

This patent is subject to a terminal disclaimer.

(21) Appl. No.: 10/696,026

(22) Filed: Oct. 28, 2003

(65) Prior Publication Data

US 2005/0088385 A1 Apr. 28, 2005

(51) Int. Cl.
 *G09G 3/36* (2006.01)
(52) U.S. Cl. .............................. 345/87; 345/88; 345/89; 345/100
(58) Field of Classification Search ............. 345/87–89, 345/418–424, 90, 100, 103, 552, 589, 649, 345/660, 695, 204, 441, 586, 581, 582, 60, 345/63, 467, 613, 698, 473, 77, 506, 602, 345/690–694; 378/4; 382/141, 260, 167, 382/441, 300, 274, 299, 154, 266; 348/625, 348/638, 441, 613, 458, 691, 448, 614, 611; 715/801

See application file for complete search history.

(56) References Cited

U.S. PATENT DOCUMENTS

| | | | |
|---|---|---|---|
| 3,971,065 A | 7/1976 | Bayer |
| 4,353,062 A | 10/1982 | Lorteije et al. |
| 4,642,619 A | 2/1987 | Togashi |
| 4,651,148 A | 3/1987 | Takeda et al. |
| 4,737,843 A | 4/1988 | Spencer |
| 4,751,535 A | 6/1988 | Myers |
| 4,773,737 A | 9/1988 | Yokono et al. |
| 4,800,375 A | 1/1989 | Silverstein et al. |
| 4,853,592 A | 8/1989 | Strathman |
| 4,874,986 A | 10/1989 | Menn et al. |
| 4,886,343 A | 12/1989 | Johnson |
| 4,920,409 A | 4/1990 | Yamagishi |
| 4,946,259 A | 8/1990 | Matino et al. |

(Continued)

FOREIGN PATENT DOCUMENTS

DE 299 09 537 U1 10/1999

(Continued)

OTHER PUBLICATIONS

Andreas Wrangsjo et al. Non-LIner Gaussuian Filtering for Image Resampling, Medical Informatics, Department of Biomedical Engineering, Linkoping University.\*

(Continued)

*Primary Examiner*—Prabodh M Dharia
(74) *Attorney, Agent, or Firm*—Haynes and Boone, LLP

(57) ABSTRACT

An image processing system that receives source image data with a first resolution and renders a target image data onto a display having a second subpixel resolution and improves image quality in said rendered target image data is described.

41 Claims, 9 Drawing Sheets

U.S. PATENT DOCUMENTS

| | | | |
|---|---|---|---|
| 4,965,565 A | 10/1990 | Noguchi | |
| 4,966,441 A | 10/1990 | Conner | |
| 4,967,264 A | 10/1990 | Parulski et al. | |
| 5,006,840 A | 4/1991 | Hamada et al. | |
| 5,010,413 A | 4/1991 | Bahr | |
| 5,052,785 A | 10/1991 | Takimoto et al. | |
| 5,062,057 A | 10/1991 | Balcken et al. | |
| 5,113,274 A | 5/1992 | Takahashi et al. | |
| 5,132,674 A | 7/1992 | Bottorf | |
| 5,189,404 A | 2/1993 | Masimo et al. | |
| 5,196,924 A | 3/1993 | Lumelsky et al. | |
| 5,311,337 A | 5/1994 | McCartney, Jr. | |
| 5,315,418 A | 5/1994 | Sprague et al. | |
| 5,334,996 A | 8/1994 | Tanigaki et al. | |
| 5,341,153 A | 8/1994 | Benzschawel et al. | |
| 5,398,066 A | 3/1995 | Martinez-Uriegas et al. | |
| 5,416,890 A | 5/1995 | Beretta | |
| 5,436,747 A | 7/1995 | Suzuki | |
| 5,438,649 A | 8/1995 | Ruetz | |
| 5,448,652 A | 9/1995 | Vaidyanathan et al. | |
| 5,450,216 A | 9/1995 | Kasson | |
| 5,461,503 A | 10/1995 | Deffontaines et al. | |
| 5,477,240 A | 12/1995 | Huebner et al. | |
| 5,485,293 A | 1/1996 | Robinder | |
| 5,541,653 A | 7/1996 | Peters et al. | |
| 5,563,621 A | 10/1996 | Silsby | |
| 5,579,027 A | 11/1996 | Sakurai et al. | |
| 5,642,176 A | 6/1997 | Abukawa et al. | |
| 5,701,283 A * | 12/1997 | Alon et al. | 369/44.41 |
| 5,710,827 A * | 1/1998 | Perumal et al. | 382/167 |
| 5,724,442 A | 3/1998 | Ogatsu et al. | |
| 5,739,802 A | 4/1998 | Mosier | |
| 5,754,226 A | 5/1998 | Yamada et al. | |
| 5,815,101 A | 9/1998 | Fonte | |
| 5,821,913 A | 10/1998 | Mamiya | |
| 5,880,707 A | 3/1999 | Aratani | |
| 5,899,550 A | 5/1999 | Masaki | |
| 5,903,366 A | 5/1999 | Hirabayashi et al. | |
| 5,917,556 A | 6/1999 | Katayama | |
| 5,929,843 A | 7/1999 | Tanioka | |
| 5,933,253 A | 8/1999 | Ito et al. | |
| 5,949,496 A | 9/1999 | Kim | |
| 5,973,664 A | 10/1999 | Badger | |
| 5,995,650 A * | 11/1999 | Migdal et al. | 382/154 |
| 6,002,446 A | 12/1999 | Eglit | |
| 6,005,582 A * | 12/1999 | Gabriel et al. | 345/586 |
| 6,008,868 A | 12/1999 | Silverbrook | |
| 6,034,666 A | 3/2000 | Kanai et al. | |
| 6,038,031 A | 3/2000 | Murphy | |
| 6,049,626 A | 4/2000 | Kim | |
| 6,054,832 A | 4/2000 | Kunzman et al. | |
| 6,061,533 A | 5/2000 | Kajiwara | |
| 6,069,670 A | 5/2000 | Borer | |
| 6,075,905 A * | 6/2000 | Herman et al. | 382/284 |
| 6,097,367 A | 8/2000 | Kuriwaki et al. | |
| 6,100,872 A | 8/2000 | Aratani et al. | |
| 6,108,122 A | 8/2000 | Ulrich et al. | |
| 6,144,352 A | 11/2000 | Matsuda et al. | |
| 6,151,001 A | 11/2000 | Anderson et al. | |
| 6,160,535 A | 12/2000 | Park | |
| 6,184,903 B1 | 2/2001 | Omori | |
| 6,188,385 B1 | 2/2001 | Hill et al. | |
| 6,219,025 B1 | 4/2001 | Hill et al. | |
| 6,225,967 B1 | 5/2001 | Hebiguchi | |
| 6,225,973 B1 | 5/2001 | Hill et al. | |
| 6,236,390 B1 | 5/2001 | Hitchcock et al. | |
| 6,239,783 B1 | 5/2001 | Hill et al. | |
| 6,243,055 B1 | 6/2001 | Fergason | |
| 6,243,070 B1 | 6/2001 | Hill et al. | |
| 6,262,710 B1 | 7/2001 | Smith | |
| 6,271,891 B1 | 8/2001 | Ogawa et al. | |
| 6,278,434 B1 | 8/2001 | Hill et al. | |
| 6,297,826 B1 | 10/2001 | Semba et al. | |
| 6,326,981 B1 | 12/2001 | Mori et al. | |
| 6,327,008 B1 | 12/2001 | Fujiyoshi | |
| 6,340,994 B1 * | 1/2002 | Margulis et al. | 348/625 |
| 6,346,972 B1 | 2/2002 | Kim | |
| 6,348,929 B1 | 2/2002 | Acharya et al. | |
| 6,360,008 B1 | 3/2002 | Susuki et al. | |
| 6,360,023 B1 | 3/2002 | Betrisey et al. | |
| 6,377,262 B1 | 4/2002 | Hitchcock et al. | |
| 6,380,945 B1 * | 4/2002 | MacInnis et al. | 345/602 |
| 6,384,836 B1 | 5/2002 | Naylor, Jr. et al. | |
| 6,393,145 B2 | 5/2002 | Betrisey et al. | |
| 6,396,505 B1 | 5/2002 | Lui et al. | |
| 6,414,719 B1 | 7/2002 | Parikh | |
| 6,466,618 B1 | 10/2002 | Messing et al. | |
| 6,483,518 B1 | 11/2002 | Perry et al. | |
| 6,486,923 B1 | 11/2002 | Maeshima et al. | |
| 6,501,446 B1 * | 12/2002 | De Haan et al. | 345/63 |
| 6,545,653 B1 * | 4/2003 | Takahara et al. | 345/87 |
| 6,545,740 B2 | 4/2003 | Werner | |
| 6,570,584 B1 | 5/2003 | Cok et al. | |
| 6,583,787 B1 * | 6/2003 | Pfister et al. | 345/441 |
| 6,600,495 B1 | 7/2003 | Boland et al. | |
| 6,624,828 B1 | 9/2003 | Dresevic et al. | |
| 6,628,827 B1 | 9/2003 | Acharya | |
| 6,661,429 B1 | 12/2003 | Phan | |
| 6,674,430 B1 * | 1/2004 | Kaufman et al. | 345/419 |
| 6,674,436 B1 | 1/2004 | Dresevic et al. | |
| 6,680,761 B1 | 1/2004 | Greene et al. | |
| 6,681,053 B1 | 1/2004 | Zhu | |
| 6,714,206 B1 | 3/2004 | Martin et al. | |
| 6,714,210 B1 * | 3/2004 | Yip et al. | 345/667 |
| 6,714,212 B1 | 3/2004 | Tsuboyama et al. | |
| 6,738,526 B1 | 5/2004 | Betrisey et al. | |
| 6,748,120 B1 | 6/2004 | Bradley | |
| 6,750,875 B1 | 6/2004 | Keely, Jr. et al. | |
| 6,768,517 B2 * | 7/2004 | Limberg et al. | 348/614 |
| 6,781,626 B1 | 8/2004 | Wang | |
| 6,795,587 B2 | 9/2004 | Slavin | |
| 6,801,220 B2 | 10/2004 | Greier et al. | |
| 6,801,674 B1 | 10/2004 | Turney | |
| 6,804,407 B2 | 10/2004 | Weldy | |
| 6,816,166 B2 * | 11/2004 | Shimizu et al. | 345/581 |
| 6,816,204 B2 * | 11/2004 | Limberg | 348/614 |
| 6,816,622 B2 * | 11/2004 | Blinn et al. | 382/260 |
| 6,833,890 B2 | 12/2004 | Hong et al. | |
| 6,836,300 B2 | 12/2004 | Choo et al. | |
| 6,850,294 B2 | 2/2005 | Roh et al. | |
| 6,867,549 B2 | 3/2005 | Cok et al. | |
| 6,885,380 B1 | 4/2005 | Primerano et al. | |
| 6,888,604 B2 | 5/2005 | Rho et al. | |
| 6,897,876 B2 | 5/2005 | Murdoch et al. | |
| 6,903,378 B2 | 6/2005 | Cok | |
| 6,903,749 B2 | 6/2005 | Soo et al. | |
| 6,928,196 B1 * | 8/2005 | Bradley et al. | 382/300 |
| 6,943,805 B2 * | 9/2005 | Snyder et al. | 345/589 |
| 6,970,170 B2 | 11/2005 | Slavin | |
| 6,999,107 B2 | 2/2006 | Matoba et al. | |
| 7,050,113 B2 | 5/2006 | Campisano | |
| 7,072,528 B2 | 7/2006 | Han | |
| 7,084,923 B2 * | 8/2006 | Brown Elliott et al. | 348/441 |
| 7,091,944 B2 * | 8/2006 | Wang | 345/100 |
| 7,103,212 B2 * | 9/2006 | Hager et al. | 382/154 |
| 7,114,174 B1 | 9/2006 | Brooks et al. | |
| 7,184,066 B2 * | 2/2007 | Elliot et al. | 345/694 |
| 7,222,306 B2 * | 5/2007 | Kaasila et al. | 715/801 |
| 7,257,278 B2 * | 8/2007 | Burks et al. | 382/312 |
| 7,379,067 B2 * | 5/2008 | Deering et al. | 345/506 |
| 2001/0020950 A1 * | 9/2001 | Shimizu et al. | 345/611 |
| 2001/0033341 A1 * | 10/2001 | Limberg | 348/614 |
| 2001/0048764 A1 | 12/2001 | Betrisey et al. | |
| 2002/0051087 A1 * | 5/2002 | Limberg et al. | 348/611 |

| | | | |
|---|---|---|---|
| 2002/0093476 A1 | 7/2002 | Hill et al. | |
| 2002/0118019 A1* | 8/2002 | Nomura | 324/509 |
| 2002/0140831 A1 | 10/2002 | Hayashi | |
| 2002/0149598 A1 | 10/2002 | Greier et al. | |
| 2002/0186229 A1* | 12/2002 | Brown Elliott | 345/649 |
| 2003/0006978 A1 | 1/2003 | Fujiyoshi | |
| 2003/0071775 A1 | 4/2003 | Ohashi et al. | |
| 2003/0071943 A1 | 4/2003 | Choo et al. | |
| 2003/0077000 A1* | 4/2003 | Blinn et al. | 382/260 |
| 2003/0098928 A1 | 5/2003 | Kim | |
| 2003/0103058 A1* | 6/2003 | Hellen Brown Elliott et al. | 345/589 |
| 2003/0128225 A1* | 7/2003 | Credelle et al. | 345/694 |
| 2003/0169265 A1* | 9/2003 | Emberling | 345/552 |
| 2003/0184571 A1* | 10/2003 | Hirayama | 345/695 |
| 2003/0214497 A1* | 11/2003 | Morishima et al. | 345/204 |
| 2003/0218618 A1 | 11/2003 | Phan | |
| 2004/0008208 A1 | 1/2004 | Dresevic et al. | |
| 2004/0021804 A1 | 2/2004 | Hong et al. | |
| 2004/0075764 A1 | 4/2004 | Law et al. | |
| 2004/0085283 A1* | 5/2004 | Wang | 345/100 |
| 2004/0085495 A1 | 5/2004 | Roh et al. | |
| 2004/0095521 A1 | 5/2004 | Song et al. | |
| 2004/0108818 A1 | 6/2004 | Cok et al. | |
| 2004/0114046 A1 | 6/2004 | Lee et al. | |
| 2004/0155895 A1 | 8/2004 | Lai | |
| 2004/0165080 A1* | 8/2004 | Burks et al. | 348/222.1 |
| 2004/0169807 A1 | 9/2004 | Rho et al. | |
| 2004/0179160 A1 | 9/2004 | Rhee et al. | |
| 2004/0183817 A1* | 9/2004 | Kaasila | 345/660 |
| 2004/0189643 A1* | 9/2004 | Frisken et al. | 345/467 |
| 2004/0189662 A1 | 9/2004 | Frisken et al. | |
| 2004/0189664 A1 | 9/2004 | Frisken et al. | |
| 2004/0196297 A1 | 10/2004 | Elliott et al. | |
| 2004/0213449 A1* | 10/2004 | Safaee-Rad et al. | 382/141 |
| 2004/0239813 A1* | 12/2004 | Klompenhouwer | 348/638 |
| 2004/0239837 A1 | 12/2004 | Hong et al. | |
| 2004/0246213 A1* | 12/2004 | Credelle et al. | 345/87 |
| 2004/0247070 A1* | 12/2004 | Ali et al. | 378/4 |
| 2004/0263528 A1 | 12/2004 | Murdoch et al. | |
| 2005/0007539 A1 | 1/2005 | Taguchi et al. | |
| 2005/0024380 A1 | 2/2005 | Lin et al. | |
| 2005/0025383 A1* | 2/2005 | Domingo et al. | 382/266 |
| 2005/0031199 A1 | 2/2005 | Ben-Chorin et al. | |
| 2005/0040760 A1 | 2/2005 | Taguchi et al. | |
| 2005/0068477 A1 | 3/2005 | Shin et al. | |
| 2005/0083356 A1 | 4/2005 | Roh et al. | |
| 2005/0094871 A1 | 5/2005 | Berns et al. | |
| 2005/0099426 A1 | 5/2005 | Primerano et al. | |
| 2005/0140634 A1 | 6/2005 | Takatori | |
| 2005/0143136 A1* | 6/2005 | Lev et al. | 455/566 |
| 2005/0162600 A1 | 7/2005 | Rho et al. | |
| 2005/0169551 A1 | 8/2005 | Messing et al. | |
| 2006/0092162 A1* | 5/2006 | Deering et al. | 345/506 |

FOREIGN PATENT DOCUMENTS

| | | |
|---|---|---|
| DE | 199 23 527 | 11/2000 |
| DE | 201 09 354 U1 | 9/2001 |
| EP | 0 322 106 A2 | 6/1989 |
| EP | 0 793 214 A1 | 9/1997 |
| EP | 1 083 539 A2 | 3/2001 |
| JP | 60-107022 | 6/1985 |
| JP | 03078390 A2 | 4/1991 |
| JP | 06-102503 | 4/1994 |
| JP | 2004004822 | 1/2004 |
| WO | WO 00/42564 | 7/2000 |
| WO | WO 00/65432 | 11/2000 |
| WO | WO 00/67196 | 11/2000 |
| WO | WO 01/29817 A1 | 4/2001 |
| WO | WO03034380 A2 * | 4/2003 |
| WO | WO 2004/021323 A2 | 3/2004 |
| WO | WO 2004/027503 A1 | 4/2004 |
| WO | WO 2004/040548 A1 | 5/2004 |
| WO | WO 2004/086128 A1 | 10/2004 |
| WO | WO 2005/050296 A1 | 6/2005 |

OTHER PUBLICATIONS

The Eighties: an image processing view Dec. 1999.*
Don P. Mitchell et al. Reconstruction Filters in Computer Graphics Aug. 1988 AT&T Bell Laboratories vol. 22.*
Image Reduction for Object Recognition Ben-Zion Shaick and Leonid Yaroslavsky Jun. 2002, Faculty of Engineering, Tel-Aviv University, Israel 4th EURASIP-IEEE.*
Adobe Systems, Inc. website, http://www.adobe.com/products/acrobat/cooltype.html.
Betrisey, C., et al., Displaced Filtering for Patterned Displays, SID Symp. Digest, 296-299, 1999.
Brown Elliott, C., "Active Matrix Display . . . ", IDMC 2000, 185-189, Aug. 2000.
Brown Elliott, C., "Color Subpixel Rendering Projectors and Flat Panel Displays," SMPTE, Feb. 27-Mar. 1, 2003, Seattle, WA pp. 1-4.
Brown Elliott, C, "Co-Optimization of Color AMLCD Subpixel Architecture and Rendering Algorithms," SID 2002 Proceedings Paper, May 30, 2002 pp. 172-175.
Brown Elliott, C, "Development of the PenTile Matrix™ Color AMLCD Subpixel Architecture and Rendering Algorithms", SID 2003, Journal Article.
Brown Elliott, C, "New Pixel Layout for PenTile Matrix™ Architecture", IDMC 2002, pp. 115-117.
Brown Elliott, C, "Reducing Pixel Count Without Reducing Image Quality", Information Display Dec. 1999, vol. 1, pp. 22-25.
"ClearType magnified", Wired Magazine, Nov. 8, 1999, Microsoft Typography, article posted Nov. 8, 1999, last updated Jan. 27, 1999 1 page.
Credelle, Thomas, "P-00: MTF of High-Resolution PenTile Matrix Displays", Eurodisplay 02 Digest, 2002 pp. 1-4.
Daly, Scott, "Analysis of Subtriad Addressing Algorithms by Visual System Models",SID Symp. Digest, Jun. 2001 pp. 1200-1203.
Gibson, S., "Sub-Pixel Rendering; How it works," Gibson Research Corp., http://www.grc.com/ctwhat.html.
Johnston, Stuart, "An Easy Read: Microsoft's ClearType," InformationWeek Online, Redmond WA, Nov. 23, 1998. 3 pages.
Johnston, Stuart, "Clarifying ClearType," InformationWeek Online, Redmond WA, Jan. 4, 1999, 4 pages.
Just Outta Beta, Wired Magazine, Dec. 1999 Issue 7-12, 3 pages.
Klompenhouwer, Michiel, Subpixel Image Scaling for Color Matrix Displays, SID Symp. Digest, May 2002, pp. 176-179.
Krantz, John et al., Color Matrix Display Image Quality: The Effects of Luminance . . . SID 90 Digest, pp. 29-32.
Lee, Baek-woon et al., 40.5L: Late-News Paper: TFT-LCD with RGBW Color system, SID 03 Digest, 2003, pp. 1212-1215.
Martin, R., et al., "Detectability of Reduced Blue-Pixel Count in Projection Displays," SID Symp. Digest, May 1993, pp. 606-609.
Messing, Dean et al., Improved Display Resolution of Subsampled Colour Images Using Subpixel Addressing, IEEE ICIP 2002, vol. 1, pp. 625-628.
Messing, Dean et al., Subpixel Rendering on Non-Striped Colour Matrix Displays, 2003 International Conf on Image Processing, Sep. 2003, Barcelona, Spain, 4 pages.
"Microsoft ClearType," website, Mar. 26, 2003, 4 pages.
Microsoft Corp. website, http://www.microsoft.com/typography/cleartype, 7 pages.
Murch, M., "Visual Perception Basics," SID Seminar, 1987, Tektronix Inc, Beaverton Oregon.
Okumura et al., "A New Flicker-Reduction Drive Method for High Resolution LCTVs", SID Digest,pp. 551-554, 2001.
Platt, John, Optimal Filtering for Patterned Displays, IEEE Signal Processing Letters, 2000, 4 pages.
Feigenblatt, Ron, "Remarks on Microsoft ClearType™", http://www.geocities.com/SiliconValley/Ridge/6664/ClearType.html, Dec. 5, 1998, Dec. 7, 1998, Dec. 12, 1999, Dec. 26, 1999, Dec. 30.

* cited by examiner $$M_{0,0} = \begin{pmatrix} 0 & 0 & 0 & 0 & 0 \\ 0 & 0 & 0 & 0 & 0 \\ 0 & 0 & 256 & 0 & 0 \\ 0 & 0 & 0 & 0 & 0 \\ 0 & 0 & 0 & 0 & 0 \end{pmatrix}$$

$$M_{0,1} = \begin{pmatrix} 0 & 0 & 0 & 0 & 0 \\ 0 & -18 & 0 & 0 & 0 \\ 0 & 178 & 0 & 0 & 0 \\ 0 & 109 & 0 & 0 & 0 \\ 0 & -12 & 0 & 0 & 0 \end{pmatrix}$$

$$M_{0,2} = \begin{pmatrix} 0 & 0 & 0 & 0 & 0 \\ 0 & -4 & 0 & 0 & 0 \\ 0 & 43 & 0 & 0 & 0 \\ 0 & 233 & 0 & 0 & 0 \\ 0 & -16 & 0 & 0 & 0 \end{pmatrix}$$

$$M_{1,1} = \begin{pmatrix} 1 & -13 & -8 & 1 \\ -13 & 124 & 76 & -9 \\ -8 & 76 & 46 & -5 \\ 1 & -9 & -5 & 1 \end{pmatrix}$$

$$M_{1,2} = \begin{pmatrix} 0 & -3 & -2 & 0 \\ -2 & 30 & 18 & -2 \\ -17 & 162 & 99 & -11 \\ 1 & -11 & -7 & 1 \end{pmatrix}$$

$$M_{2,2} = \begin{pmatrix} 0 & -1 & -1 & 0 \\ -1 & 7 & -4 & -3 \\ 39 & 213 & -15 & 1 \\ -3 & -15 & 1 & \end{pmatrix}$$

(RED)
```
 0  -1  -1   0  0
-1   9   9  -1  0
-10 124 124 -10 0
-1   9   9  -1  0
 0  -1  -1   0  0
```

(BLUE)
```
-6  58  222  -18  0
```

CROSS-COLOR ADDED TO ABOVE FILTER (GREEN→RED)
```
 0  1   0   0  0
 0 -4  -4   0  0
-2  9   9  -2  0
 0 -4  -4   0  0
 0  0   1   0  0
```

(GREEN)
```
 0   0    0   0   0
 0   0   -2   0   0
 0   0   16   0   0
-2  16  200  16  -2
 0   0   16   0   0
 0   0   -2   0   0
 0   0    0   0   0
```

CROSS-COLOR ADDED TO ABOVE FILTER (RED→GREEN)
```
0  0   0   0  0
0 -2  -4  -2  0
0 -4  24  -4  0
0 -2  -4  -2  0
0  0   0   0  0
```

(GREEN)
```
 0   0    0   0   0
 0  -3  -13   1   0
-3  32  124 -10   0
-3  32  124 -10   0
 0  -3  -13   1   0
```

CROSS-COLOR ADDED TO ABOVE FILTER (RED→GREEN)
```
 0  0   0   0  0
 0 -1  -1   0  0
-1  2   2  -1  0
-1  2   2  -1  0
 0 -1  -1   0  0
```

(RED)
```
 0   0    0   0   0
 0  -1  -10  -1   0
-1   9  124   9  -1
-1   9  124   9  -1
 0  -1  -10  -1   0
 0   0    0   0   0
```

CROSS-COLOR ADDED TO ABOVE FILTER (GREEN→RED)
```
0  0   0   0   0
0  0  -2   0   0
0 -4   9  -4   1
1 -4   9  -4   0
0  0  -2   0   0
0  0   0   0   0
```

FIG. 14

SYSTEM AND METHOD FOR PERFORMING IMAGE RECONSTRUCTION AND SUBPIXEL RENDERING TO EFFECT SCALING FOR MULTI-MODE DISPLAY

RELATED APPLICATIONS

The present application is related to commonly owned U.S. patent application Ser. No. 10/696,235 entitled "DISPLAY SYSTEM HAVING IMPROVED MULTIPLE MODES FOR DISPLAYING IMAGE DATA FROM MULTIPLE INPUT SOURCE FORMATS", filed Oct. 28, 2003, and published as US Patent Application Publication 2005/0099540 (the '540 application), which is hereby incorporated herein by reference in its entirety. U.S. Ser. No. 10/696,235 is now issued as U.S. Pat. No. 7,084,923 B2.

BACKGROUND

In commonly owned United States Patent Applications: (1) U.S. patent application Ser. No. 09/916,232 (US Publication Number 2002/0015110, the '110 application), entitled "ARRANGEMENT OF COLOR PIXELS FOR FULL COLOR IMAGING DEVICES WITH SIMPLIFIED ADDRESSING," filed Jul. 25, 2001; (2) U.S. patent application Ser. No. 10/278,353 (US Publication Number 2003/0128225, the '225 application), entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002; (3) U.S. patent application Ser. No. 10/278,352 (US Publication Number 2003/0128179, the '179 application), entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed Oct. 22, 2002; (4) U.S. patent application Ser. No. 10/243,094), (US Publication Number 2004/0051724, the '724 application), entitled "IMPROVED FOUR COLOR ARRANGEMENTS AND EMITTERS FOR SUB-PIXEL RENDERING," filed Sep. 13, 2002; (5) U.S. patent application Ser. No. 10/278,328 (US Publication Number 2003/0117423, the '423 application), entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002; (6) U.S. patent application Ser. No. 10/278,393 (US Publication Number 2003/0090581, the '581 application), entitled "COLOR DISPLAY HAVING HORIZONTAL SUB-PIXEL ARRANGEMENTS AND LAYOUTS," filed Oct. 22, 2002; (7) U.S. patent application Ser. No. 10/347,001 (US Publication Number 2004/0080479, the '479 application), entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003, each of which is herein incorporated by reference in its entirety, novel sub-pixel arrangements are disclosed for improving the cost/performance curves for image display devices.

For certain subpixel repeating groups having an even number of subpixels in a horizontal direction, the following systems and techniques to affect proper dot inversion schemes are disclosed and are herein incorporated by reference in their entirety: (1) U.S. patent application Ser. No. 10/456,839 (US Publication Number 2004/0246280, the '280 application), entitled "IMAGE DEGRADATION CORRECTION IN NOVEL LIQUID CRYSTAL DISPLAYS" filed Jun. 6, 2003; (2) U.S. patent application Ser. No. 10/455,925 (US Publication Number 2004/0246213, the '213 application), entitled "DISPLAY PANEL HAVING CROSSOVER CONNECTIONS EFFECTING DOT INVERSION" filed Jun. 6, 2003; (3) U.S. patent application Ser. No. 10/455,931 (US Publication Number 2004/0246381, the '381 application), entitled "SYSTEM AND METHOD OF PERFORMING DOT INVERSION WITH STANDARD DRIVERS AND BACKPLANE ON NOVEL DISPLAY PANEL LAYOUTS" filed Jun. 6, 2003; (4) U.S. patent application Ser. No. 10/455,927 (US Publication Number 2004/0246278, the '278 application), entitled "SYSTEM AND METHOD FOR COMPENSATING FOR VISUAL EFFECTS UPON PANELS HAVING FIXED PATTERN NOISE WITH REDUCED QUANTIZATION ERROR" filed Jun. 6, 2003; (5) U.S. patent application Ser. No. 10/456,806 (US Publication Number 2004/0246279 the '279 application), entitled "DOT INVERSION ON NOVEL DISPLAY PANEL LAYOUTS WITH EXTRA DRIVERS" filed Jun. 6, 2003; (6) U.S. patent application Ser. No. 10/456,838 (US Publication Number 2004/0246404 the '404 application), entitled "LIQUID CRYSTAL DISPLAY BACKPLANE LAYOUTS AND ADDRESSING FOR NON-STANDARD SUBPIXEL ARRANGEMENTS" filed Jun. 6, 2003; and (7) U.S. patent application Ser. No. 10/696,236 (US Publication Number 2005/0083277 the '277 application), entitled "IMAGE DEGRADATION CORRECTION IN NOVEL LIQUID CRYSTAL DISPLAYS WITH SPLIT BLUE SUBPIXELS", filed concurrently with the present disclosure.

These improvements are particularly pronounced when coupled with sub-pixel rendering (SPR) systems and methods further disclosed in those applications and in commonly owned U.S. Patent Applications: (1) U.S. patent application Ser. No. 10/051,612 (US Publication Number 2003/0034992, the '992 application), entitled "CONVERSION OF RGB PIXEL FORMAT DATA TO PENTILE MATRIX SUB-PIXEL DATA FORMAT," filed Jan. 16, 2002; (2) U.S. patent application Ser. No. 10/150,355 US Publication Number 2003/0103058, the '058 application), entitled "METHODS AND SYSTEMS FOR SUB-PIXEL RENDERING WITH GAMMA ADJUSTMENT," filed May 17, 2002; (3) U.S. patent application Ser. No. 10/215,843 (US Publication Number 2003/0085906), the '906 application), entitled "METHODS AND SYSTEMS FOR SUB-PIXEL RENDERING WITH ADAPTIVE FILTERING," filed Aug. 8, 2002; (4) U.S. patent application Ser. No. 10/379,767 (US Publication Number 2004/0196302, the '302 application), entitled "SYSTEMS AND METHODS FOR TEMPORAL SUB-PIXEL RENDERING OF IMAGE DATA" filed Mar. 4, 2003; (5) U.S. application Ser. No. 10/379,765 (US Publication Number 2004/0174380, the '380 application), entitled "SYSTEMS AND METHODS FOR MOTION ADAPTIVE FILTERING," filed Mar. 4, 2003; (6) U.S. patent application Ser. No. 10/379,766 (US Publication Number 2004/0174375 the '375 application), entitled "SUB-PIXEL RENDERING SYSTEM AND METHOD FOR IMPROVED DISPLAY VIEWING ANGLES" filed Mar. 4, 2003; (7) U.S. patent application Ser. No. 10/409,413 (US Publication Number 2004/0196297, the '297 application), entitled "IMAGE DATA SET WITH EMBEDDED PRE-SUBPIXEL RENDERED IMAGE" filed Apr. 7, 2003, which are hereby incorporated herein by reference in their entirety.

Improvements in gamut conversion and mapping are disclosed in commonly owned and co-pending U.S. Patent Applications: (1) U.S. patent application Ser. No. 10/691,200 (US Publication Number 2005/0083345 the '345 application), entitled "HUE ANGLE CALCULATION SYSTEM AND METHODS", filed Oct. 21, 2003; (2) U.S. patent application Ser. No. 10/691,377 (US Publication Number 2005/0083341, the '341 application), entitled "METHOD AND APPARATUS FOR CONVERTING FROM SOURCE COLOR SPACE TO RGBW TARGET COLOR SPACE", filed Oct. 21, 2003; (3) U.S. patent application Ser. No. 10/691,396 (US Publication Number 2005/0083352, the '352 application), entitled "METHOD AND APPARATUS FOR CONVERTING FROM A SOURCE COLOR SPACE TO A TARGET COLOR SPACE", filed Oct. 21, 2003; and (4) U.S. patent application Ser. No. 10/690,716 (US Publication Number 2005/0083344, the '344 application), entitled "GAMUT CONVERSION SYSTEM AND METHODS", filed Oct. 21, 2003 which are all hereby incorporated herein by reference in their entirety. All patent applications mentioned in this specification are hereby incorporated by reference in their entirety.

BRIEF DESCRIPTION OF THE DRAWINGS

The accompanying drawings, which are incorporated in, and constitute a part of this specification illustrate exemplary implementations and embodiments of the invention and, together with the description, serve to explain principles of the invention.

FIG. 2B depicts the filters needed to implement cubic interpolation as a filtering operation

FIG. 12 shows a set of polyphase filters that combine interpolation with subpixel rendering color correction.

FIG. 14 shows a table of polyphase filters for implementing area resampling subpixel rendering.

DETAILED DESCRIPTION

Reference will now be made in detail to implementations and embodiments, examples of which are illustrated in the accompanying drawings. Wherever possible, the same reference numbers will be used throughout the drawings to refer to the same or like parts.

Figure 6:
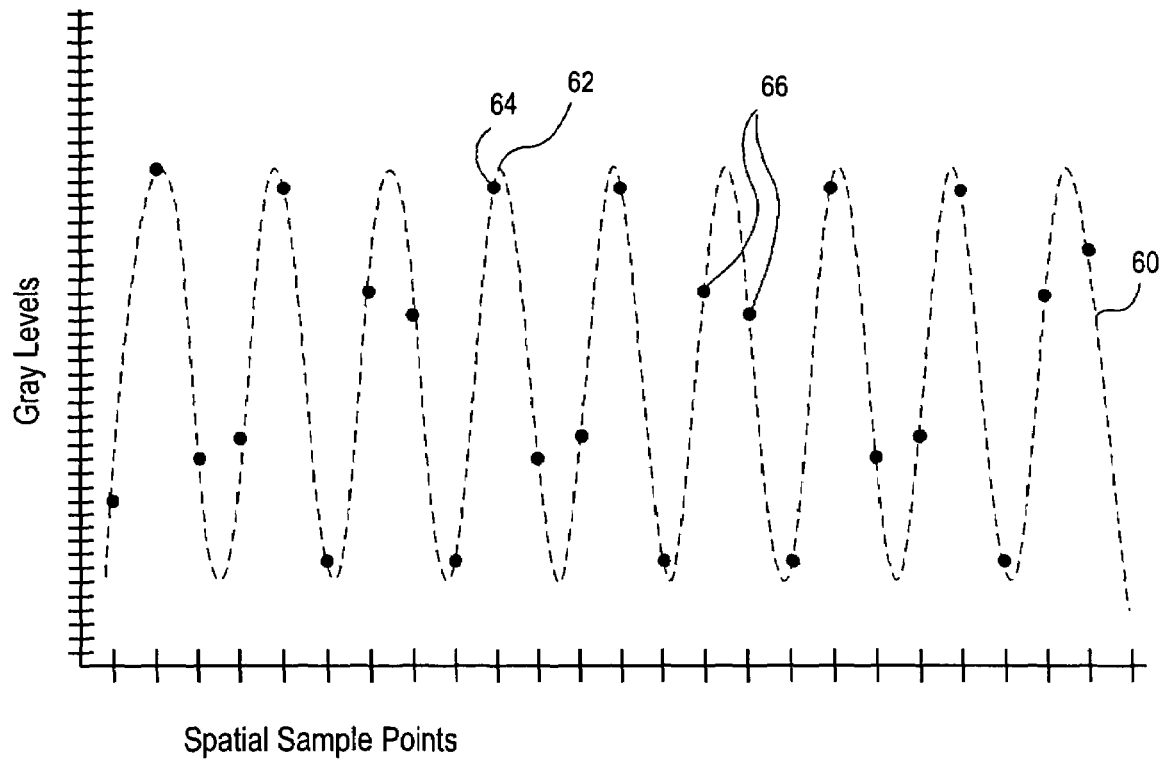
FIG. 6 depicts a sine wave signal sampled at an arbitrary rate.
Figure 8:
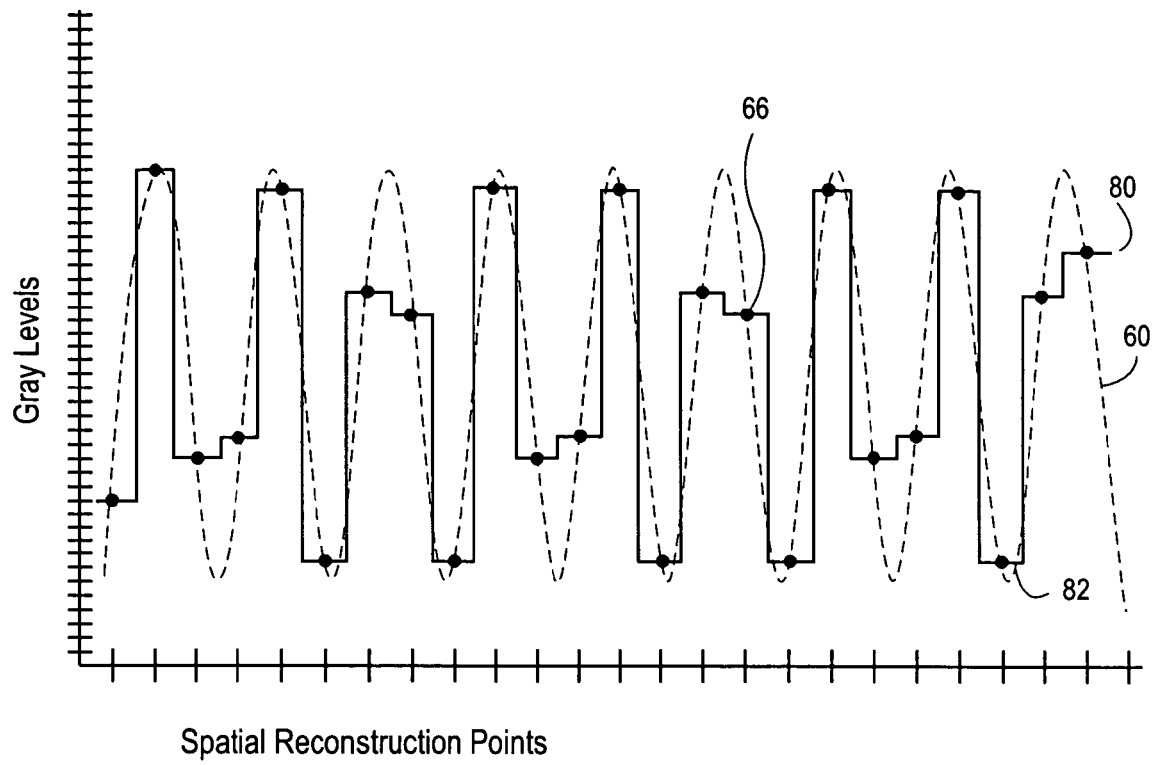
FIG. 8 depicts the signal of FIG. 6 reconstructed by whole pixels using only the original sample points, exhibiting severe moiré distortion.

Shown in FIG. 6 is a sine wave signal 60 being sampled well below the Nyquist Limit. It should be noted that some of the peaks 62 are sampled 64, but at other points, the sample 66 is taken on the shoulders. Since this is a band-limited image, an ideal optical image reconstruction low pass filter may be used to reconstruct the original sine wave exactly; the ideal filter will reconstruct a bright or dark peak between the shoulder samples. Mathematically, an ideal filter may be constructed using the well known sinc function. The sinc function has both positive and negative terms. While such a filter can be implemented in the ideal world of mathematics, there is no such thing as an "ideal" optical reconstruction filter in the real world of electronic displays—since in optics, there is no such thing as "negative light". Therefore, the lack of a real world reconstruction filter for displays means that the peaks are not reconstructed, leading to distortions of the image called moiré. FIG. 8 shows the sampled sine wave 60 being reconstructed 80 by square whole pixels 82 (in a one dimensional slice of the image, with the brightness, gray levels, shown in the second dimension). It should be noted that the sample values 66 that were taken on the shoulders of the peaks are reconstructed as broad, flat areas. This distorted image condition is what is normally found in flat panel televisions and other visual display products. It would be desirable to reduce or eliminate this moiré without adding undue cost or complexity to the system. It might also be desirable to avoid introducing unwanted artifacts such as color error or loss of image contrast.

Moiré can appear to the viewer to have the same damaging effect as aliasing, creating a false signal, but the two are quite different. Aliasing occurs when a signal to be sampled has frequency components at or above the Nyquist Limit, which cause 'fold-over', creating a false signal below the Nyquist Limit. Once sampled, it is difficult to distinguish an aliased signal from a real signal. Not so with moire; moiré may be identified and filtered out of the sampled signal by using a proper reconstruction filter. Since an aliased signal may not be identified and filtered out after sampling, care must be taken to remove signals at or above the Nyquist Limit before sampling. This creates a "band-limited-image".

Moiré distortion occurs most strongly to real signals just below the Nyquist Limit. As the signal frequency increases, approaching the Nyquist Limit, the moiré amplitude increases, as a fraction of the signal amplitude, as well as wavelength increases. The result is a signal that looks similar to an amplitude modulated (AM) signal, the carrier frequency being the Nyquist Limit and the moiré spatial frequency being the difference between the Nyquist Limit frequency and the signal being sampled. Conversely, as the original signal frequency is reduced below the Nyquist Limit, the resulting moiré signal amplitude and wavelength decrease, until the moiré spatial frequency equals the signal frequency, at which point, the moiré distortion amplitude modulation disappears. Below this point, some moiré amplitude modulation may reappear, but the amplitude will be small. The point at which the moiré amplitude modulation first disappears is defined as the Moiré Limit. It is at one half of the Nyquist Limit, or one fourth the reconstruction point frequency.

Figure 7:
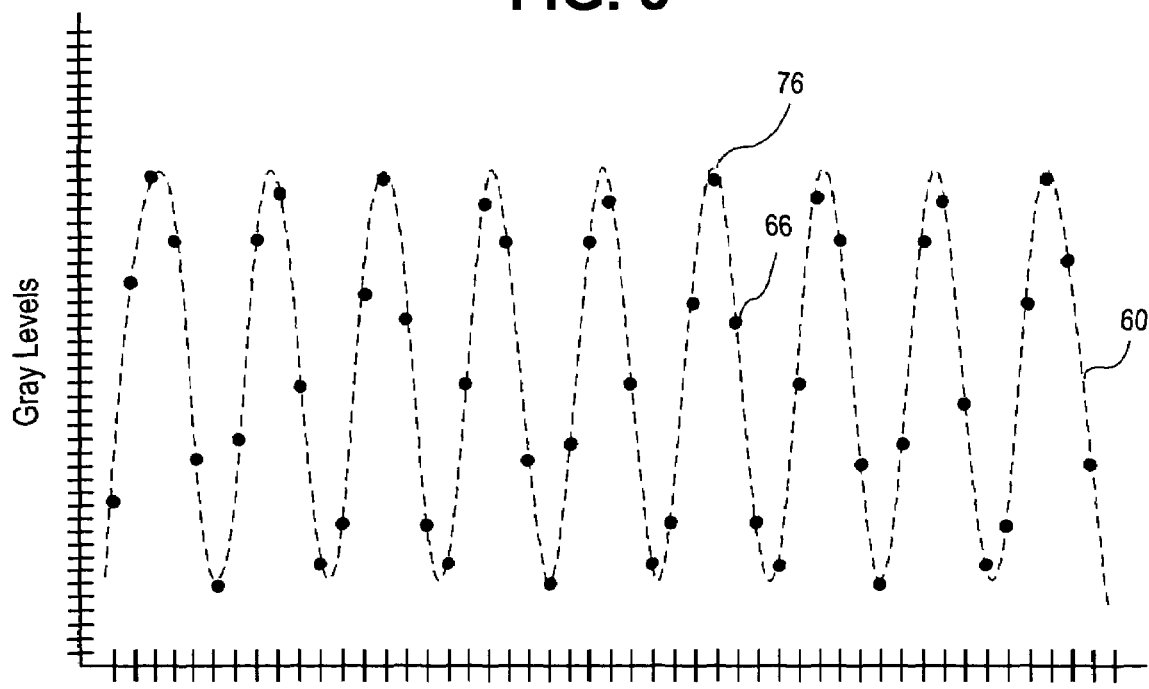
FIG. 7 depicts the signal of FIG. 6 with interpolated points between each sampled point.

If the number of samples of a given image increases, to over four samples per signal cycle at the band-limit, the image would need to be only slightly filtered, with an optical blur filter acting as a real world non-ideal optical reconstruction filter. Indeed, if the reconstruction frequency of the display were high enough, the optical characteristics of the human eye would serve as such a real world optical reconstruction filter. In the absence of such an over-sampled original image, the extra samples may be found by interpolation using any suitable algorithm. FIG. 7 shows the same original sampled sine wave signal 60 of FIG. 6, with interpolated values 76 between each original value 66. Where the original sample 66 missed the peak, the interpolated value 76 may extend to it. This reduces the moiré distortion.

Figure 9:
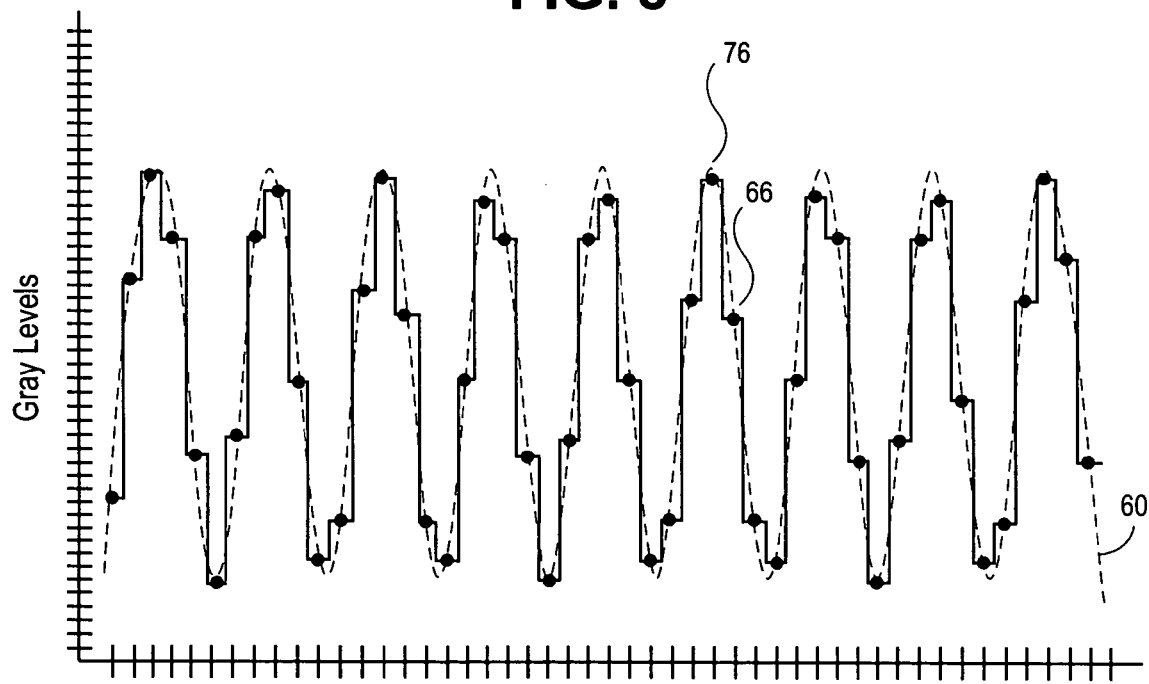
FIG. 9 depicts the signal of FIG. 6 reconstructed by subpixel rendering using both the original samples of FIG. 6 and the interpolated points of FIG. 7, exhibiting significantly reduced moiré distortion.

With subpixel rendering, the number of points that may be independently addressed to reconstruct the image is increased, without increasing the number of physical pixels in a display. This increases the spatial frequency of the Moiré Limit as shown in FIG. 9. For example when the green subpixels are reconstructing the original sample points 66 on the shoulders, the red subpixels are reconstructing the interpolated points near the peaks and visa-versa. An additional optical 'real world' reconstruction filter is now capable of reconstructing band-limited images, without the need of "negative light", needing merely the addition of a slight blur to round off the sharp edges of the subpixels.

Figure 10:
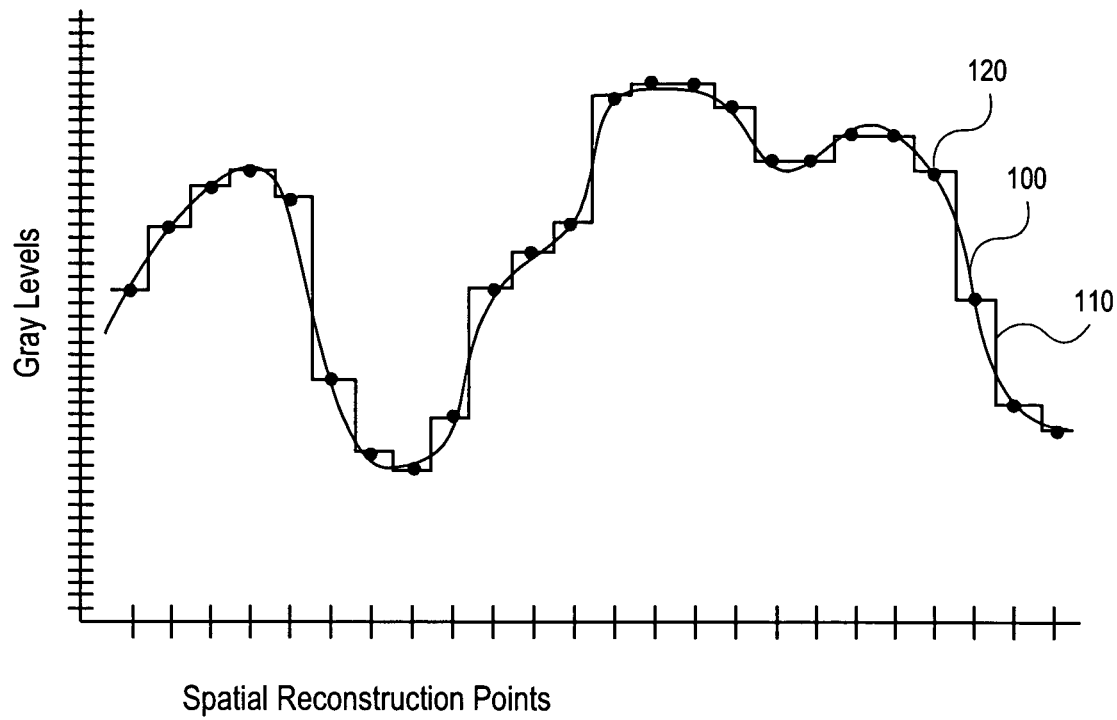
FIG. 10 depicts an image signal sampled at an arbitrary rate and reconstructed by whole pixels using only the original sample points, exhibiting severe moiré distortion.
Figure 11:
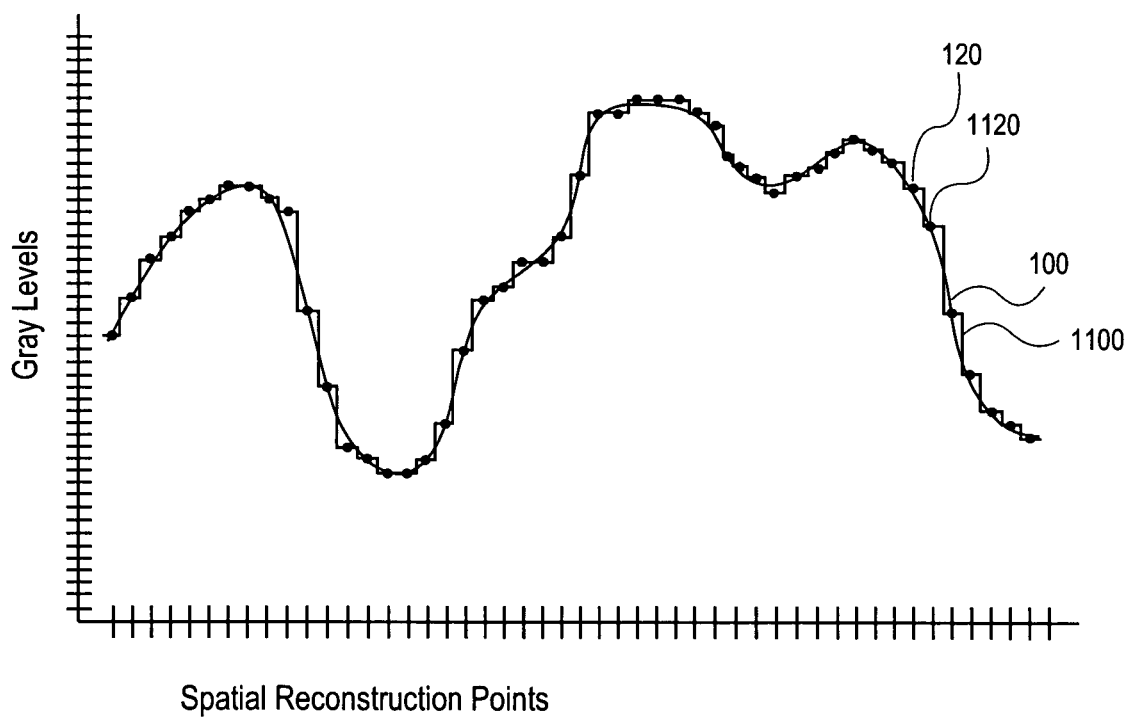
FIG. 11 depicts the image signal of FIG. 10 with interpolated points between each sampled point, reconstructed by subpixel rendering using both the original samples of FIG. 10 and the interpolated points, exhibiting significantly reduced moiré distortion.

FIG. 10 shows a representation of a band-limited image 100 being sampled 120 and reconstructed 110 without subpixel rendering. It should be noted that the resulting image 110 is both "blocky" and course. In FIG. 11, the same image 100 is being reconstructed 1100 using subpixel rendering with interpolated points 1120 between the original sample points 120. Here, it should be noted the improved image fidelity and reduced pixelation artifacts.

The process of creating interpolated points between the original samples may be thought of as a form of image scaling. In some of the examples of the present invention, the scaling ratio may be thought of as "one-to-two" or 2× scaling, as there is one interpolated point for each original point. Other 'scaling ratios' may be implemented and are envisioned within the scope of the present invention.

Conventional interpolation (e.g. linear, bi-linear, cubic, bi-cubic, sinc, windowed sinc, and the like) on images is typically thought of as computationally expensive operations involving floating point operations on surrounding pixels. This is particularly true in the case of scaling image data (e.g. to upsample, downsample, or otherwise resample an image) to fit a particular display. Thus, most practitioners concentrate on finding ways to build hardware to implement the complicated polynomial equations.

Several embodiments of the present invention presented herein illustrate systems and methods for implementing interpolation schemes as weighted averages with much less computing intensive algorithms and circuitry as conventionally needed. Additionally, once the interpolation weighted average coefficients and matrices are determined, then the present invention describes methods and systems for advantageously processing the interpolated data with other image processing steps (e.g. subpixel rendering and the like).

Interpolation/Data Duplication Using Repeat Cell Symmetries

The following discussion is meant to exemplify the techniques of the present invention; and is not meant to limit the scope of the present invention. The discussion describes a display system that desires to input an image with a first resolution (e.g. VGA) and to either interpolate, duplicate, or otherwise reconstruct (e.g. via area resampling) the image data on the vertical and horizontal axes and then to subpixel render the data—so that the resulting image is at an effectively higher second resolution, in so far as that higher resolution provides additional reconstruction points, shown on a display having fewer subpixels than a conventional display with that said second resolution. However, the scope of the present invention is broad enough to encompass other systems and methods to treat interpolation using repeat cell symmetries and to effectively use those interpolation methods together with other image processing methods, such as SPR.

The concept of repeat cell symmetries to scale and subpixel render image data is discussed in the '992 application and in the '612 application. In that application, the processing methods of area resampling input image data from a first format (e.g. traditional RGB data) to be scaled and rendered on a display having novel subpixel layouts uses the fact that only a few number of area resampling filters need to be used because there exists a repeat cell symmetry across the target display.

As will be discussed further below, a similar concept works for interpolation of data such that only a small number of filter kernels need to be used in order to effect the desired interpolation—without need of expensive floating point calculation or hardware.

As with area resampling algorithms with scaling, at any particular scaling ratio, there are a small number of relationships between input and output pixels that repeat over and over across and down the image. It is only desired to calculate area resampling coefficients for this "repeat cell" and re-use them appropriately. The same thing could be substantially done with interpolation. To take merely one example—cubic interpolation—in each location in a repeat cell, the cubic equations can be calculated "off-line" (i.e. as part of the design process of the system), converted into weighting coefficients, and stored in tables.

Typically, the weighting values are calculated from cubic equations (e.g. blending functions) that are implemented as floating point and have traditionally been difficult to implement in hardware. But the idea of the repeat cell allows us to pre-calculate a small number of filter kernels instead. These filter kernels, or tables of coefficients, can be stored into hardware (e.g. ROM or flash memory or the like) and used to do real-time cubic interpolation on images. In one exemplary system, the interpolation hardware could be implemented as a 4×4 filter kernel or any such suitably sized matrix—with the matrix coefficients matching the stored filter kernels. This is known in the art as "polyphase filtering".

For this example using cubic interpolation, it is possible to start with any standard cubic formula (e.g. the Catmul-Rom cubic formula or the like). It may be desirable to select a cubic formula that passes through all the control points because it would interpolate new values between known pixels and would produce the original image values when possible. Although it may be possible (for the purposes of the present invention) to use other forms of cubic splines that use the input points as "suggestions", they may not pass very close to the original values. The Catmull-Rom formula for a one dimensional cubic curve is given in the following matrix equation:

$$\begin{bmatrix} (T^3 & T^2 & T & 1) \cdot \dfrac{\begin{pmatrix} -1 & 3 & -3 & 1 \\ 2 & -5 & 4 & -1 \\ -1 & 0 & 1 & 0 \\ 0 & 2 & 0 & 0 \end{pmatrix}}{2} \cdot \begin{pmatrix} P1 \\ P2 \\ P3 \\ P4 \end{pmatrix} \end{bmatrix} \quad \text{Formula (1)}$$

The [$T^3$, $T^2$, T, 1] matrix corresponds to the cubic equation—$a*T^3+b*T^2+c*T+d*1$. The [P1, P2, P3, P4] matrix is a list of the control points, and 4×4 matrix in the middle is the basis matrix. This 4×4 matrix corresponds to the Catmul-Rom matrix and has the property that if all the matrix dot products are performed, the resulting equation will have the correct values for the implied a, b, c and d coefficients. The result of carrying out the calculation of Formula (1) above yields:

$$\frac{-1}{2} \cdot P1 \cdot T^3 + P1 \cdot T^2 - \frac{1}{2} \cdot P1 \cdot T + \qquad \text{Formula (2)}$$
$$\frac{3}{2} \cdot P2 \cdot T^3 - \frac{5}{2} \cdot P2 \cdot T^2 + P2 - \frac{3}{2} \cdot P3 \cdot T^3 +$$
$$2 \cdot P3 \cdot T^2 + \frac{1}{2} \cdot P3 \cdot T + \frac{1}{2} \cdot P4 \cdot T^3 - \frac{1}{2} \cdot P4 \cdot T^2.$$

Formula (2) may be rewritten to collect terms around the control points as follows:

$$\left(\frac{-1}{2} \cdot T^3 + T^2 - \frac{1}{2} \cdot T\right) \cdot P1 + \left(\frac{3}{2} \cdot T^3 - \frac{5}{2} \cdot T^2 + 1\right) \cdot P2 + \qquad \text{Formula (3)}$$
$$\left(2 \cdot T^2 + \frac{1}{2} \cdot T - \frac{3}{2} \cdot T^3\right) \cdot P3 + \left(\frac{1}{2} \cdot T^3 - \frac{1}{2} \cdot T^2\right) \cdot P4.$$

Figure 1:
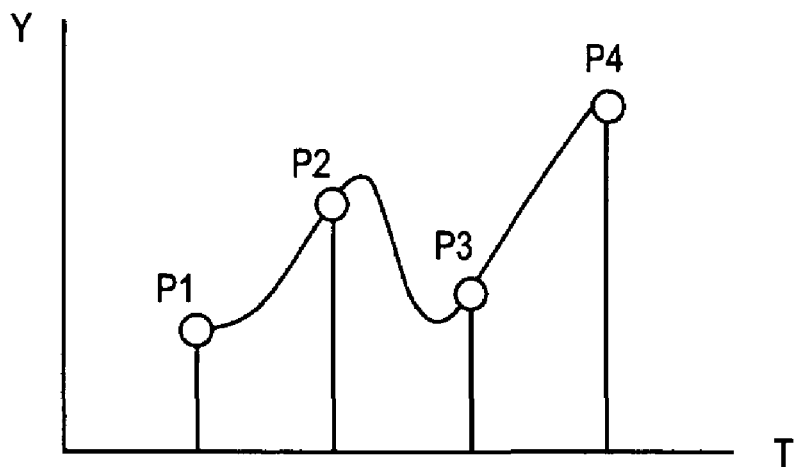
FIG. 1 represents four input samples of a signal to be interpolated

Formula (3) resembles a weighted sum (average) of the four control points. For any given value of T, it will weigh each control point by a different amount before they are summed. As T ranges between 0 and 1, the result moves from P2 to P3. For example, if T is 0 the result is simply P2, if T is 1 the result is P3. For all values of T between 0 and 1, the result may not necessarily be between P2 and P3, because the cubic processing that includes surrounding points P1 and P4 could make the value swoop up or down. FIG. 1 is an example of the possible curve fitting that a cubic equation might produce in the one dimensional case across a single scan line.

The four points P1 through P4 are control points, intensity values across a single scan line of an image. The Y direction on the graph is intensity of the subpixels (e.g. in the different color planes, such as red, green or blue). The T direction is along the pixels in a row. The exaggerated curvature between P2 and P3 shows how the cubic curve can interpolate values above and below the control points.

Figure 2A:
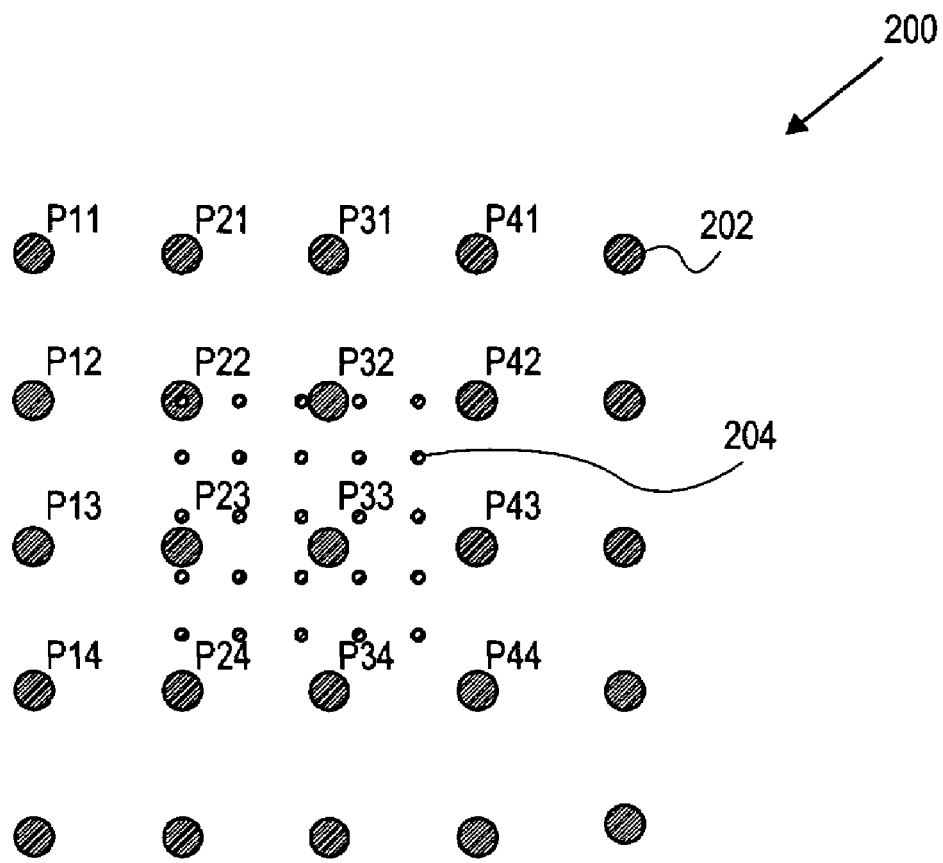
FIG. 2A represents an array of sample points and an array of points to be interpolated.

In a two dimensional image (using the cubic example above), one possible embodiment is to look at four rows at once and four source pixels (e.g. control points) at once. Thus, the expression of above formulas could be slightly changed to use 4 different sets of control points, P11, P12, P13 and P14 for the first row, down to P41, P42, P43 and P44 for the fourth row. This is shown in FIG. 2A. The value of T for the X direction (Tx) would be plugged into these 4 formula, resulting in 4 vertical control points. These would be plugged back into Formula 3, a fifth time, with the value of T in the Y direction (Ty). The result is a single value that lies somewhere inside the quadrangle defined by the 4 inner control points P22, P23, P32 and P33.

It is desired to convert these into a set of weight coefficients that are multiplied by sample points later. To accomplish this, it is possible to solve the equations symbolically and collect terms for each of the sample points to find out how to calculate those coefficients. Plugging he formula for the 4 control point rows into the positions of the 4 vertical control points results in the following matrix equation:

$$(Ty^3 \;\; Ty^2 \;\; Ty \;\; 1) \cdot CM \cdot \begin{bmatrix} \left[(Tx^3 \;\; Tx^2 \;\; Tx \;\; 1) \cdot CM \cdot \begin{pmatrix} P11 \\ P12 \\ P13 \\ P14 \end{pmatrix}\right] \\ \left[(Tx^3 \;\; Tx^2 \;\; Tx \;\; 1) \cdot CM \cdot \begin{pmatrix} P21 \\ P22 \\ P23 \\ P24 \end{pmatrix}\right] \\ \left[(Tx^3 \;\; Tx^2 \;\; Tx \;\; 1) \cdot CM \cdot \begin{pmatrix} P31 \\ P32 \\ P33 \\ P34 \end{pmatrix}\right] \\ \left[(Tx^3 \;\; Tx^2 \;\; Tx \;\; 1) \cdot CM \cdot \begin{pmatrix} P41 \\ P42 \\ P43 \\ P44 \end{pmatrix}\right] \end{bmatrix} \qquad \text{Formula 4}$$

Where CM is the Catmul-Rom basis matrix:

$$CM := \frac{\begin{pmatrix} -1 & 3 & -3 & 1 \\ 2 & -5 & 4 & -1 \\ -1 & 0 & 1 & 0 \\ 0 & 2 & 0 & 0 \end{pmatrix}}{2}. \qquad \text{Formula 5}$$

Performing the matrix dot products symbolically, then collecting the terms for each of the control points results in 16 different formula, one for each of the coefficients for each control point.

Formulae 6

$$P11(Tx, Ty) := \frac{-1}{2} \cdot Ty^3 \cdot Tx^2 + Ty^2 \cdot Tx^2 + \frac{1}{4} \cdot Ty \cdot Tx^3 - \frac{1}{2} \cdot Ty^2 \cdot Tx^3 - \frac{1}{2} \cdot Ty \cdot Tx^2 + \frac{1}{4} \cdot Ty \cdot Tx + \frac{1}{4} \cdot Ty^3 \cdot Tx^3 - \frac{1}{2} \cdot Ty^2 \cdot Tx + \frac{1}{4} \cdot Ty^3 \cdot Tx$$

$$P12(Tx, Ty) := \frac{3}{2} \cdot Ty^2 \cdot Tx^3 - \frac{3}{4} \cdot Ty \cdot Tx^3 - \frac{1}{2} \cdot Ty^3 - \frac{5}{2} \cdot Ty^2 \cdot Tx^2 + \frac{5}{4} \cdot Ty \cdot Tx^2 + \frac{5}{4} \cdot Ty^3 \cdot Tx^2 - \frac{3}{4} \cdot Ty^3 \cdot Tx^3 + Ty^2 - \frac{1}{2} \cdot Ty$$

$$P13(Tx, Ty) := \frac{-1}{4} \cdot Ty^3 \cdot Tx - \frac{1}{4} \cdot Ty \cdot Tx - Ty \cdot Tx^2 + \frac{3}{4} \cdot Ty^3 \cdot Tx^3 + \frac{1}{2} \cdot Ty^2 \cdot Tx - \frac{3}{2} \cdot Ty^2 \cdot Tx^3 + 2 \cdot Ty^2 \cdot Tx^2 + \frac{3}{4} \cdot Ty \cdot Tx^3 - Ty^3 \cdot Tx^2$$

$$P14(Tx, Ty) := \frac{1}{4} \cdot Ty \cdot Tx^2 - \frac{1}{4} \cdot Ty \cdot Tx^3 - \frac{1}{4} \cdot Ty^3 \cdot Tx^3 + \frac{1}{2} \cdot Ty^2 \cdot Tx^3 - \frac{1}{2} \cdot Ty^2 \cdot Tx^2 + \frac{1}{4} \cdot Ty^3 \cdot Tx^2$$

$$P21(Tx, Ty) := \frac{-1}{2} \cdot Tx + Tx^2 - \frac{1}{2} \cdot Tx^3 - \frac{3}{4} \cdot Ty^3 \cdot Tx^3 - \frac{3}{4} \cdot Ty^3 \cdot Tx + \frac{3}{2} \cdot Ty^3 \cdot Tx^2 - \frac{5}{2} \cdot Ty^2 \cdot Tx^2 + \frac{5}{4} \cdot Ty^2 \cdot Tx + \frac{5}{4} \cdot Ty^2 \cdot Tx^3$$

$$P22(Tx, Ty) := 1 + \frac{25}{4} \cdot Ty^2 \cdot Tx^2 + \frac{9}{4} \cdot Ty^3 \cdot Tx^3 - \frac{5}{2} \cdot Tx^2 + \frac{3}{2} \cdot Tx^3 - \frac{5}{2} \cdot Ty^2 - \frac{15}{4} \cdot Ty^2 \cdot Tx^3 + \frac{3}{2} \cdot Ty^3 - \frac{15}{4} \cdot Ty^3 \cdot Tx^2$$

$$P23(Tx, Ty) := -5 \cdot Ty^2 \cdot Tx^2 + 3 \cdot Ty^3 \cdot Tx^2 + \frac{15}{4} \cdot Ty^2 \cdot Tx^3 + \frac{1}{2} \cdot Tx + 2 \cdot Tx^2 - \frac{3}{2} \cdot Tx^3 + \frac{3}{4} \cdot Ty^3 \cdot Tx - \frac{5}{4} \cdot Ty^2 \cdot Tx - \frac{9}{4} \cdot Ty^3 \cdot Tx^3$$

-continued $$P24(Tx, Ty) := \frac{-5}{4} \cdot Ty^2 \cdot Tx^3 + \frac{3}{4} \cdot Ty^3 \cdot Tx^3 + \frac{1}{2} \cdot Tx^3 - \frac{1}{2} \cdot Tx^2 + \frac{5}{4} \cdot Ty^2 \cdot Tx^2 - \frac{3}{4} \cdot Ty^3 \cdot Tx^2$$

$$P31(Tx, Ty) := \frac{-3}{2} \cdot Ty^3 \cdot Tx^2 + \frac{1}{2} \cdot Ty \cdot Tx^2 - Ty^2 \cdot Tx + \frac{3}{4} \cdot Ty^3 \cdot Tx + \frac{3}{4} \cdot Ty^3 \cdot Tx^3 - Ty^2 \cdot Tx^3 + 2 \cdot Ty^2 \cdot Tx^2 - \frac{1}{4} \cdot Ty \cdot Tx^3 - \frac{1}{4} \cdot Ty \cdot Tx$$

$$P32(Tx, Ty) := 2 \cdot Ty^2 - \frac{3}{2} \cdot Ty^3 + \frac{1}{2} \cdot Ty + \frac{15}{4} \cdot Ty^3 \cdot Tx^2 - \frac{9}{4} \cdot Ty^3 \cdot Tx^3 + 3 \cdot Ty^2 \cdot Tx^3 - 5 \cdot Ty^2 \cdot Tx^2 - \frac{5}{4} \cdot Ty \cdot Tx^2 + \frac{3}{4} \cdot Ty \cdot Tx^3$$

$$P33(Tx, Ty) := Ty \cdot Tx^2 - \frac{3}{4} \cdot Ty \cdot Tx^3 - 3 \cdot Ty^3 \cdot Tx^2 + 4 \cdot Ty^2 \cdot Tx^2 + \frac{9}{4} \cdot Ty^3 \cdot Tx^3 + \frac{1}{4} \cdot Ty \cdot Tx - 3 \cdot Ty^2 \cdot Tx^3 + Ty^2 \cdot Tx - \frac{3}{4} \cdot Ty^3 \cdot Tx$$

$$P34(Tx, Ty) := -Ty^2 \cdot Tx^2 + \frac{3}{4} \cdot Ty^3 \cdot Tx^2 - \frac{1}{4} \cdot Ty \cdot Tx^2 + Ty^2 \cdot Tx^3 - \frac{3}{4} \cdot Ty^3 \cdot Tx^3 + \frac{1}{4} \cdot Ty \cdot Tx^3$$

$$P41(Tx, Ty) := \frac{-1}{2} \cdot Ty^2 \cdot Tx^2 + \frac{1}{2} \cdot Ty^3 \cdot Tx^2 + \frac{1}{4} \cdot Ty^2 \cdot Tx + \frac{1}{4} \cdot Ty^2 \cdot Tx^3 - \frac{1}{4} \cdot Ty^3 \cdot Tx^3 - \frac{1}{4} \cdot Ty^3 \cdot Tx$$

$$P42(Tx, Ty) := \frac{5}{4} \cdot Ty^2 \cdot Tx^2 + \frac{3}{4} \cdot Ty^3 \cdot Tx^3 - \frac{5}{4} \cdot Ty^3 \cdot Tx^2 - \frac{3}{4} \cdot Ty^2 \cdot Tx^3 - \frac{1}{2} \cdot Ty^2 + \frac{1}{2} \cdot Ty^3$$

$$P43(Tx, Ty) := \frac{1}{4} \cdot Ty^3 \cdot Tx - Ty^2 \cdot Tx^2 - \frac{3}{4} \cdot Ty^3 \cdot Tx^3 - \frac{1}{4} \cdot Ty^2 \cdot Tx + Ty^3 \cdot Tx^2 + \frac{3}{4} \cdot Ty^2 \cdot Tx^3$$

-continued $$P44(Tx, Ty) := \frac{-1}{4} \cdot Ty^2 \cdot Tx^3 - \frac{1}{4} \cdot Ty^3 \cdot Tx^2 + \frac{1}{4} \cdot Ty^2 \cdot Tx^2 + \frac{1}{4} \cdot Ty^3 \cdot Tx^3.$$

These formulae may then be converted into 4×4 filter kernels before being used in hardware. This conversion involves calculating each of the above equations for a given pair of Tx, Ty values and plugging the 16 results into a 4×4 matrix of sample values to use in scaling hardware.

It should be appreciated that the Tx and Ty values inside a repeat cell are numbers that may range between 0 and 1 to generate the coefficients for an output pixel that lies between the four central control points. One embodiment for generating these parametric T values for each of the filter kernels will now be discussed. FIG. 2A shows an example of a portion of a grid 200 of input sample points with a single repeat cell of output resample points overlaid on top of them.

In this example, the ratio of input pixels to output pixels in this case is 2:5, which is the ratio between a 640 pixel wide image and a 1600 pixel wide image. This is a common ratio that a computer display system may be required to scale. The large black dots 202 represent the geometric centers of the input pixels. They are labeled in the same manner as the input control points in the cubic equations above. The small gray dots 204 represent the geometric centers of the output pixels. For clarity, only one repeat cell of output pixels are shown, but this cell is repeated over and over again in actual usage. Each repeat cell has the same relationship to nearby input sample points. It should be appreciated that other repeat cells will be found for other scaling ratios and that the general present discussion applies equally well to other scaling ratios.

Also, in this example, the repeat cell is aligned with the first output resample point falling exactly on an input sample point. Other alignments are possible, for example aligning in the middle of the space between 4 input points. Changing the alignment of the repeat cell may have desirable effects, as will be described below. However, aligning exactly at the upper left corner produces some convenient initialization values and makes the example easier to describe.

The first output pixel in the first row of the repeat cell is exactly aligned, so the parametric T values for this position equal zero. In this case, where the input to output ratio is 2:5, the second output pixel in the first row is ⅖ths of the way between P22 and P32 and the third output pixel ⅘ths of the way. The fourth output pixel is ⅚ths of the way, which places it ⅕th of the way past P32. This "overflow" above 1 means that it is time to advance the cubic input parameters to the right by one input column. Thus, the numbering scheme of input pixels may be re-done to drop the first column and include the unlabeled column on the right. The last output pixel in the first row is ⅗ths of the way past P32. The process is substantially identical for any row or any column of the repeat cell, generating values for Tx or Ty that are rational numbers between 0 and 1 but always fractions of fifths in this case. The process of calculating the numerators of these fractions for the general case of any scale factor is substantially identical to that described in the '992 and the '612 applications, describing resampling with scaling.

When these fractional values are plugged into the equations of Formula 6, the result is a set of 4×4 tables of coefficients—filter kernels for the scaling hardware to use. Just as in area resampling with scaling, it might be expected to have 25 filter kernels for the 25 different resample points (grey dots) in FIG. 2A. However, many of these filter kernels are mirror images of each other on different axes. Thus, it suffices to calculate a reduced number—6 in this case—as long as the hardware flips them or reads them in the appropriate order. For this example, 6 such possible filter kernels are shown in FIG. 2B:

The filter coefficients may be, as here, multiplied by 256 (or some other value depending on the system) to make the values convenient for implementing in hardware. The subscripts on the M's indicate the position of the filter kernel in the repeat cell, where 0,0 indicates the upper left, 0,1 indicates the one below it in the repeat cell, etc. It is interesting to examine these kernels to get a feel for how the weighted average works. The one labeled $M_{0,0}$ is the case where the output pixel lands directly on top of an input pixel so the P22 coefficient in the kernel is the only weight value and it is 256—which is the maximum value thus, logically equivalent to multiplying by 1.0. Scanning down the column of filter kernels, that weight value gets smaller and the weight value for P23 gets larger. Scanning diagonally down the table of filter kernels, it is noticed that the weight value for P33 is getting larger as the kernel is built to calculate values loser to P33.

Changing the Repeat Cell Alignment

In the examples above, aligning the repeat cell so that its upper left corner landed exactly on an input pixel was only one way to lay out the repeat cell. Although this may create some convenient initial values, this may not always be the desired way to arrange the repeat cells. Another embodiment occurs by not aligning the sample points, but rather by aligning the edges of the resample areas. A single row 300 of input and output pixels is shown in FIG. 3.

Figure 3:
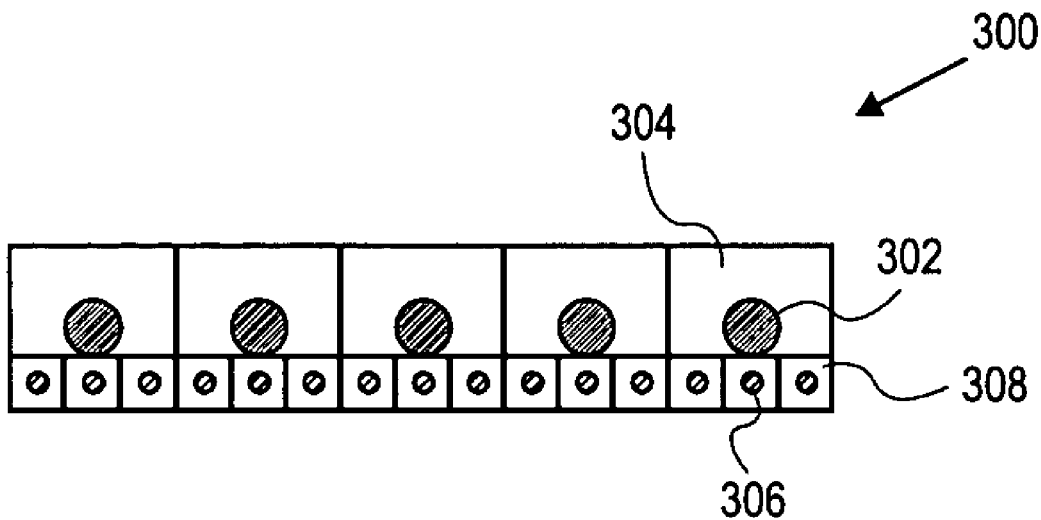
FIG. 3 shows input and output pixels with their sample areas aligned

FIG. 3 shows a 1:3 scaling ratio where the black dots 302 are input pixels in the center of their implied sample areas 304 and the gray dots 306 are the resample points inside their resample areas 308. The alignment used for the repeat cells in FIG. 2A would look like FIG. 4 if a 1:3 scaling ratio is used As may be seen in FIG. 4, the output sample points extend off the edge of the implied sample areas. It is possible to make assumptions about such situations and one assumption that may suffice in this case is that the edges that are outside the input image are black. Using this black assumption and the alignment of FIG. 4, the left edge will terminate on an input pixel value but the right hand edge will fade to black. Even in the sample area alignment of FIG. 3, the first and last resample points still extend past the first and last input sample point. With cubic interpolation, this might cause the edges to fade slightly towards black. That situation may be changed by using a different assumption about the areas outside the input image. For example, the assumption could be made to repeat the nearest input value for samples outside the input image. A linear interpolation of the last two input points could be employed; or possibly a cubic interpolation could be used to generate the missing values outside the image.

Figure 4:
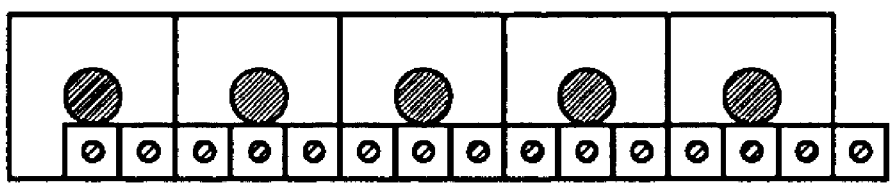
FIG. 4 depicts input and output pixels with their centers aligned
Figure 5:
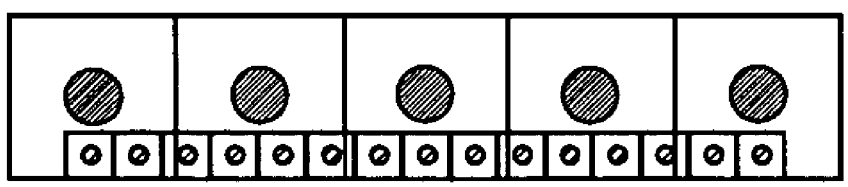
FIG. 5 depicts one embodiment of input output pixel alignment.

It should be noticed that the left edge of the sample point alignment shown in FIG. 4 is good—i.e. it chooses one of the input points for the first output point. It might be desirable to do this on the right hand edge as well. It should be further noticed that if the output array was only 13 pixels wide, FIG. 4 would be desired. But as the output size is often a given, it might suffice to change the scale factor instead to make the 15th pixel land in that position. FIG. 5 shows how it might be possible to have the resample points land, with the first and last pixels exactly aligned with the first and last input sample points:

The position of the first output pixel has been moved over by about one, and the scale factor has been changed from 5:15 (1:3) to approximately 5:17. The position of the first output pixel relative to the first input pixel may be changed in either software and/or hardware by initializing a remainder term to a different value. It is possible to change the scale factor by rebuilding the table, which could be accomplished off-line beforehand, and changing the constants that determine when to switch to the next input pixel. Those should be minor changes to the hardware, however, the filter table may became either larger or smaller. To calculate the scale factor, Formula 7 may be employed:

$$\frac{(osize-1) \cdot isize}{isize-1} = 17.5. \qquad \text{Formula 7}$$

This results in a scale factor of 5:17.5 which is close to that shown in FIG. 5. In one embodiment, it might be desirable to keep the numbers whole—to rationalize in this case, a ratio of 10:35 may be used which could be simplified to 2:7.

In the case of scaling XGA to UXGA (or 1024 pixels across to 1600 pixels), this vase has a possible scaling ratio of 16:25 with the sample area alignment assumption of FIG. 3. This may employ a table of 625 filter kernels to implement in hardware (and slightly less with symmetry). However, with Formula 7 above, the scale ratio with the new sample point alignment assumption of FIG. 5 is only 5:8. This requires a table of substantially less kernels—only 64 Filter kernels, almost a 10 fold decrease in the hardware gate requirements in this case. For the vertical dimensions of XGA and UXGA (which are 768 and 1200 respectively), the formula yields the same ratio of 5:8.

This "sample point alignment" is possibly an important assumption that a system designer should try out with every system built. If it produces a better scale factor than the original "sample area alignment", then gates in the hardware may be saved. If the original assumption produces a better scale factor, then other designs may be tried to accommodate the "fade to black" situation on the edges. In fact, one of those possible embodiments is to let the pixels fade to black and still achieve acceptable results.

2× Scaling Mode

Now, it will be described methods and systems for performing 2× scaling on input image data. Such a scaling mode is useful—as further discussed in the above related patent application—for a multi-mode display device, such as a television or monitor that can display, e.g. VGA data into an HD format. Such a display—comprising one of a number of novel subpixel layouts discussed in several of the co-owned applications incorporated by reference—may display several digital TV resolutions, as well as display regular TV resolution with an improved image reconstruction filter. In one embodiment of such a display, a combination of cubic interpolation, subpixel rendering and cross-color sharpening may produce acceptable images in regular TV mode, largely free of moiré. In particular, the cubic interpolation for the special case of 2× scaling involves simple numbers and hence less expensive processing.

In 2× scaling, every other reconstruction point value lands on an input pixel sample point and no calculations may be needed at those reconstruction points. The values in-between fall at T=½, and substituting this into Formula 3 above results in the following equation:

$$-\frac{1}{16}P1 + \frac{9}{16}P2 + \frac{9}{16}P - \frac{1}{16}P4 \qquad \text{Formula 8}$$

When the matrix equation with T=½ is simplified, it turns into a simple weighted average of the surrounding 4 pixel values. This is equivalent to a 4×1 filter kernel with values:

$[-\frac{1}{16}\ \frac{9}{16}\ \frac{9}{16}\ -\frac{1}{16}].$

It should be noted how the denominator of all these numbers is a convenient power of two, making the divide a simple combination of right shifts and addition. Even the multiplication of 9/16 is simple, which can be accomplished by left shifting the original value two times, once by one bit, the other by four bits, followed by the addition of the two shifted values. This set of coefficients in the filter kernel may be implemented in very simple hard coded digital logic to provide a very low cost convolution engine.

Displaying a standard 640×480 television signal onto a panel as discussed herein—i.e. one that comprises 640×3× 960 physical subpixels; but has greater image quality with subpixel rendering—may take advantage of interpolation followed by cross-color sharpened subpixel rendering to effectively scale the image to 1280×960 logical pixels. This reconstructs the image with reduced moiré and aliasing artifacts since the interpolation serves as a low-pass reconstruction filter for the luminance signal while the sharpened subpixel rendering filter services to remove any spatial frequencies that may cause chromatic aliasing, thus preserving the color balance and image constrast. This combination algorithm solves a concern noted in the prior art, that of sharpness vs color error in subpixel rendered scaling.

One possible interpolation could be the Catmul-Rom algorithm, among others (e.g. windowed sinc function). For the purposes of illustration, however, the following discussion is tailored to the Catmul-Rom algorithm. To simplify the calculations, a boundary condition may be set such that the incoming image is in-phase with one of the brighter subpixels—e.g. in this case, the upper right hand corner green of the subpixel repeat group 1316 or 1320 of FIG. 13. Another assumption that might be made is that the red and green, the brighter two of the three colors, are on a true square grid. With these assumptions, one possible set of interpolation coefficients for an axis separable filter could be (as discussed above):

$-\frac{1}{16}, \frac{9}{16}, \frac{9}{16}, -\frac{1}{16}.$

As also mentioned above, these numbers may be easy to implement using bit shift multiply and accumulate. To use this axis separable interpolation filter, as it scans in a row of data, a second, 2× wider row of data could be fed and stored in a line buffer. Half of the information might be the original data, all three colors, interleaved with the interpolated data, all three colors. Then when three rows plus two columns is filled, the data could be used to interpolate and store the missing row data, using the same filter as above, but operating in the vertical direction. Following behind by one row (in the new, expanded row count) could be a cross-color sharpening subpixel render algorithm, looking at the results of the interpolation above. Since all of those coefficients are simply binary shift multiply and accumulate, the system is kept simple and fast. The main cost is the row buffers, three instead of two. Shown below is the cross-color subpixel rendering filter. It is a combination of an area resampling filter, in this case the "Diamond filter" and a cross-color "DOG Wavelet" ("Difference of Gaussian").

$$\begin{array}{ccc} -.0625 & 0 & -0.625 \\ 0 & .25 & 0 \\ -.0625 & 0 & -.0625 \end{array} \quad + \quad \begin{array}{ccc} 0 & .125 & 0 \\ .125 & .5 & .125 \\ 0 & .125 & 0 \end{array} \quad = \quad \begin{array}{ccc} -.0625 & .125 & -.0625 \\ .125 & .75 & .125 \\ -.0625 & .125 & -.0625 \end{array}$$

DOG Wavelet + Area Resample = Cross-Color Sharpening Kernel

The first filter above, the DOG Wavelet performs the cross-color sharpening by sampling a different color than the second, Area Resample, filter (as disclosed in the incorporated applications above). Yet another embodiment of performing the reconstruction filter is to directly sample the data using a filter that is the convolution of the above three filtering operations. As previously mentioned, for reconstruction of band limited images such as photographs and video it is sometimes desirable to use BiCubic interpolation. However, there is some probability that color error may result when directly subpixel rendering using BiCubic interpolation. Convolving the BiCubic interpolation with the Area Resampling filters for that particular subpixel architecture will substantially adjust for and/or correct this error. As this convolution may cause some additional blurring or loss of contrast of the image, some sharpening may be added to compensate for any such possible blurring, by using the DOG Wavelet. The following technique may be used on any subpixel arrangement with suitably designed interpolation filter, subpixel rendering Area Resample filter, and sharpening filter. For explanatory purposes we have chosen the particular example but it is to be appreciated that the technique will work on any subpixel arrangement and "scaling" factor.

However, display systems are often built based on non-separable filters. It may therefore be desirable to build two dimensional filters to perform the cubic interpolation in existing systems. Thus, to create novel color corrected BiCubic Subpixel Rendering polyphase filters for the five and six subpixel repeat cell arrangements 1320, 1312, 1322, & 1323 of FIG. 13, one embodiment may perform the following:

First, generate BiCubic filter kernel array as disclosed above. A set of polyphase kernels are thus generated, similar to the kernels of FIG. 2B. For each filter kernel, convolve each kernel with the 3×3 neighborhood by the coefficients of the diamond filter and the cross-color DOG wavelet discussed above. Then add all of the resulting values from each kernel that corresponds to the same input sample. In theory, convolving a 4×4 biCubic filter with a 3×3 sharpened Area Resample filter in this manner may result in a 5×5 filter kernel. However, in practice, the result may often be a smaller kernel. It may also be possible to reduce the resulting convolved filter kernel size by several methods. The first is to set very small values at the edge of the kernel to zero, adding its value to a nearby diagonal kernel value to maintain color balance. The second is to adjust the interpolation grid location (phase) or scale such that all or most of the 5×5 kernels collapse to 4×4.

Figure 13:
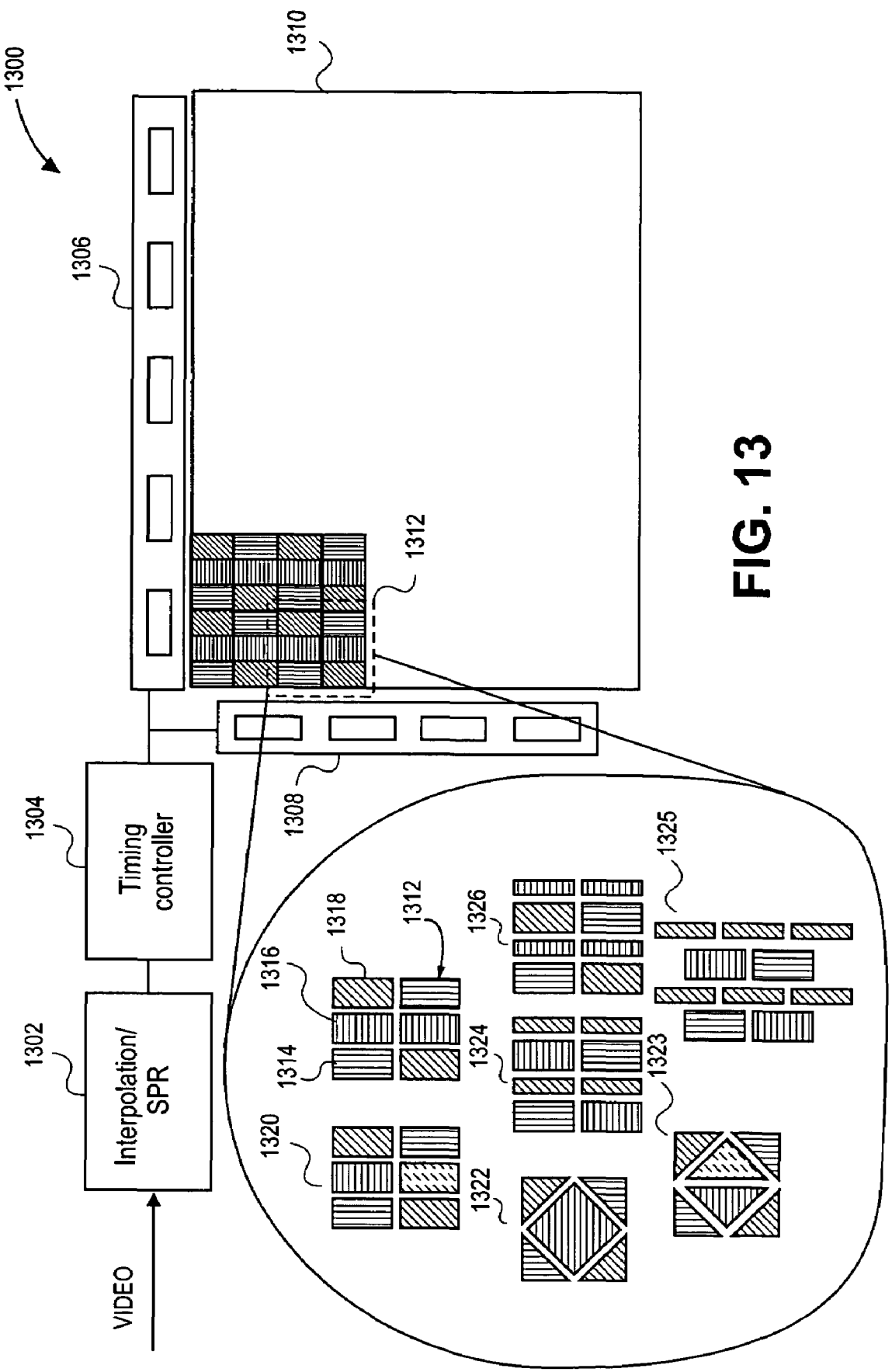
FIG. 13 depicts a flat panel display with alternative subpixel repeat cell arrangements.

For several of the subpixel layouts shown in FIG. 13 and discussed in the above mentioned patent applications, the blue subpixel may not add to the addressability of the display panel to a great degree. Further, since this is for image reconstruction of band limited images, the Fourier energy of the high spatial frequencies will be low. Therefore, for correct color imaging in the above system, it may be desirable to determine the value of the blue subpixel by the convolution of the blue values taken at the same points as the red/green checkerboard and the blue subpixel rendering filter, such as a 1×2 box filter for the six subpixel repeat cell 1312 in FIG. 13 or a 2×2 box filter for the five subpixel repeat cell 1322, or the 1×3 tent filter for the eight subpixel repeat cell 1326.

In this example, several interpolation filters are used in the convolution with the subpixel rendering color correction filter. One is in line horizontally, the same 4×1 filter as discussed above −1/16, 9/16, 9/16, 1/16, one is in line vertically, the transpose of that one (rotated 90°), and the third one is for points midway between 4 surrounding input points. The third filter is shown below. The numbers in this filter are still reasonably easy to multiply by in special purpose hardware without the cost of a full multiplier cell.

| 1 | −9 | −9 | 1 |
|---|----|----|---|
| −9 | 81 | 81 | −9 |
| −9 | 81 | 81 | −9 |
| 1 | −9 | −9 | 1 |

The above numbers are to be divided by 256. The above 4×4 filter kernel is generated by convolving the 4×1 first filter shown earlier with the same coefficients in the 1×4 second filter. The result of the convolution of the Diamond filter, Cross-Color DOG wavelet, and the interpolation filters is shown in FIG. 12.

An alternative 4×4 filter that will result in sharper images, which we shall call a "box-cubic" filter is:

| 0 | −8 | −8 | 0 |
|---|----|----|---|
| −8 | 80 | 80 | −8 |
| −8 | 80 | 80 | −8 |
| 0 | −8 | −8 | 0 |

One-to-One Image Reconstruction

The eight subpixel repeat cell arrangements 1324 & 1325 which have four green, two red, and two blue subpixels per repeat cell 1324 & 1325 of FIG. 13 may be mapped one-to-one; one-input-pixel-to-one-green-subpixel and still have reduced moiré distortion by interpolating the values of the intermediate reconstruction points at the red and blue subpixels.

One of the subpixel repeat cell arrangements 1324 has the red and green subpixel in line with the green subpixel rows. For conventional color correct subpixel rendering the blue and red subpixels may be filtered with a very simple 2×1 box filter: ½, ½. This also can be viewed as being a linear interpolation between the two original sample points collocated at the green subpixels. For better moiré reduction, the box filter may be replaced with the simple 4×1 cubic filter discussed above: −1/16, 9/16, 9/16, 1/16. This may reduce the moiré in the horizontal direction.

The other eight subpixel repeat cell arrangement 1325 has the red and blue subpixels displaced to the interstitial position in both axis. For conventional color correct subpixel rendering, the red and blue subpixels may be filtered between the four original sample points collocated at the green subpixels using a simple 2×2 box filter:

| | |
|---|---|
| ¼ | ¼ |
| ¼ | ¼ |

This likewise may be viewed as a being a linear interpolation between the four original sample points collocated at the green subpixels. For better moiré reduction, the box filter may be replaced with the simple 4×4 "box-cubic" filter discussed above:

This interpolation will reduce the moiré distortion in all axis, while still maintaining color balance and image contrast. Alternatively, the simple axis separable bicubic interpolation algorithm, either as a 4×4 or separated into two operations, as discussed above, may be used.

Examining the six subpixel repeat cell 1323 with non-rectangular subpixels, one may note that the blue and the white subpixel together occupy an interstitial position between the red/green checkerboard positions. Thus, the blue and the white may likewise use the simple 4×4 "box-cubic" filter or the axis separable filter discussed above. Also examining the five subpixel repeat cell arrangement 1322 one notes that too has a blue subpixel that occupies an interstitial position between the red/green subpixel checkerboard positions. Thus, this blue subpixel may likewise use the filters discussed here.

The six subpixel repeat cell arrangement 1320 with one blue and one white that are in line with the red/green rows may be color correct subpixel rendered using a 2×3 'box-tent' filter on the blue and white subpixels:

| | |
|---|---|
| 0.125 | 0.125 |
| 0.25 | 0.25 |
| 0.125 | 0.125 |

The box-tent filter may be replaced with a 4×3 "tent-cubic" filter to reduce the moiré distortion:

| | | | |
|---|---|---|---|
| −1/64 | 9/64 | 9/64 | −1/64 |
| −1/32 | 9/32 | 9/32 | −1/32 |
| −1/64 | 9/64 | 9/64 | −1/64 |

Image Reconstruction on a RGBW System

One embodiment of a present system would display wide standard (e.g. 852×480) television signal onto the present system that has a RGBW architecture (e.g. 852×3×960) with six subpixel repeat cell 1320 as shown in FIG. 13). This system may take advantage of interpolation, followed by luminance sharpened subpixel rendering to effectively "scale" the image to another resolution (e.g. 1704×960) on the red/green grid and interpolate or start with an intermediate reconstruction point between the red/green points using the white and possibly the blue subpixels. This reconstructs the image with reduced moiré and aliasing artifacts since the interpolation to the additional reconstruction points, most especially using red, green, and white, serves as a low-pass reconstruction filter.

RGBW panels require a multiprimary mapping of the input data. The data may come in several standard video formats, but the most common would be RGB. This color data should be converted to RGBW. Inside of the mapping algorithm, a luminance signal may be generated. This luminance signal may be used by the image reconstruction filter to sharpen up the color image components. Thus, the multiprimary mapping algorithm may output RGBWL data.

One possible interpolation performed on the data could be a Catmul-Rom algorithm. Similar to the discussion above, to simplify the calculations, a boundary condition is set such that the incoming image is in-phase with one of the subpixels, in this case we will use the lower white subpixel. Of course, it will be appreciated that other subpixels could be chosen for this; however as white is the brightest, it may be advantageous to use white. Using the brightest subpixel as the in-phase point may create the least interpolation artifacts on the resulting image. With this assumption, one embodiment of the interpolation coefficients for an axis separable filter to interpolate the raw values for the red/green checkerboard grid might be:

−1/16, 9/16, 9/16, −1/16 for the vertical interpolation and
−18/256, 198/256, 85/256, −9/256 and its mirror image for the horizontal interpolation.

To use this axis separable interpolation filter, as the system scans in a row of data, a second, row of vertically interpolated data is fed and stored in a line buffer for the interpolated row, two final rows above (e.g. behind). For displays with square grid arrangement of white and blue, only the RGBL data is interpolated since the white (W) component is defined by the above assumptions to land directly on the non-interpolated input data. On a staggered (e.g. hexagonally) arranged white and blue arrangement displays, the full RGBWL data is to be interpolated. Horizontal interpolation may be performed on the in-phase rows as soon as the data comes in, while it may be desirable to perform horizontal interpolation on the out-of-phase rows after vertical interpolation. Alternatively, the horizontal interpolation may be performed first, which may save on the number of the more complex multiplications, followed by the simpler to implement vertical interpolation.

After the RGBL or RGBWL data has been interpolated, the blue and white plane data are complete. The red and green data may be subpixel rendered, color error correction filtered using the diamond filter with the addition of a luminance driven "cross-color" sharpening operation, as shown above. Alternatively, the sharpening on the red and green subpixel values may be performed by the cross-color DOG wavelet as described earlier.

An alternative image reconstruction algorithm may be used on the RGBW six subpixel repeat cell arrangement 1320, or with the alternative, non-rectangular six subpixel repeat cell 1323 of FIG. 3. For these arrangements of subpixels it may be desirable to center the original samples with the upper left green subpixel, in an analogous manner to that described for the six subpixel repeat cell 1312 described above. As before, the values for the other green and the two reds may be found using the same convenient interpolation as above. The white and the blue subpixel values may also be found using interpolation using the 4×1 and 1×4 axis separable bicubic filter in a like manner as that described above, as the phase relationships remain the same.

9 to 8 Scaling Mode on RGBW

Scaling an image down slightly by a ratio of 9 to 8 is a special case that has occurred in some display layouts. One embodiment for performing nine-to-eight (9:8) "down-scaling" on the red/green subpixel grid will now be disclosed.

At first glance, down-scaling of an image that has been band-limited at the Nyquist Limit may seem to invite introduction of irreparable aliasing distortion, but the presence of the additional bright white subpixel removes this danger. One can understand this by imagining that one looks at only half of the sample points of a critically band-limited image; the resulting image would exhibit severe aliasing; the equivalent to sampling the image below the band-limit. But with the full complement, the aliasing is removed. Thus, in the case of displaying an image on such layouts as the six subpixel repeat cells 1320 & 1323 of FIG. 13, the additional white subpixel means that there are five substantially bright subpixels per repeat cell. Thus, what appears to be a "down-scaling" factor of 9:8 for the red/green grid may alternatively be viewed as a 9:12 "upscaling" ratio when including the white subpixel as an addition reconstruction point. The addition of the white subpixel and its use as a reconstruction point allows higher resolution images to be displayed without aliasing and with reduced moiré. While the blue subpixels have limited luminance, they do have some. If these are also counted into the scaling ratio, then this ratio may be viewed as being nine-to-sixteen (9:16), which being close to the minimum desired nine-to-eighteen (9:18), would nearly eliminate any moiré distortion.

The tables and other instructions below are designed for scaling 1920×1080 RGBW images to displays comprising certain subpixel layouts as disclosed in the incorporated commonly assigned patent applications above. These layouts may comprise a certain number of physical subpixel repeat cell arrangements (e.g. 852×480) on the display; but, because of certain subpixel rendering algorithms, the display may render images at a higher resolution (e.g. 1704×960 "logical" pixels). As 1920 times ⁸⁄₉ is 1706.6666 logical pixels, it may be desirable to clip a small amount of data on the right or left edges. As 1080 times ⁸⁄₉is 960, there should be no compromise vertically.

The red and green sub-pixel resample points may be considered, or assumed, to be substantially evenly distributed on a square grid, so that regular "diamond" area resample filters may be used. Using area resampling in this instance offers the advantage of a 3×3 filter kernel that performs interpolation and subpixel rendering color correction in one pass. Since this is a "down-scaling" operation onto the red/green grid, there will be more reconstruction points than sample points. The previously disclosed (in the '992 application) red-green filter generation procedure suffices/works in this case and generated the following tables for scaling to the red and green subpixel grid while subpixel rendering them.

For Table 1 below, the following assumptions are provided merely for explanatory reasons and are not limiting as to the scope of the present system. All filter coefficients are numbers to be divided by 256. The filter kernel max size needed is 3×3. Symmetry reduces the number of filters to ten filters—so the memory to store these filters may not need to exceed 90 bytes.

TABLE 1

| 0 | 31 | 1 |
|---|---|---|
| 31 | 101 | 44 |
| 1 | 44 | 3 |

| 0 | 19 | 0 |
|---|---|---|
| 29 | 100 | 41 |
| 3 | 57 | 7 |

| 0 | 19 | 1 |
|---|---|---|
| 19 | 97 | 53 |
| 1 | 53 | 13 |

TABLE 1-continued

| 0 | 10 | 0 |
|---|---|---|
| 25 | 97 | 35 |
| 7 | 69 | 13 |

| 0 | 10 | 0 |
|---|---|---|
| 16 | 94 | 47 |
| 3 | 66 | 20 |

| 0 | 9 | 1 |
|---|---|---|
| 9 | 88 | 60 |
| 1 | 60 | 28 |

| 0 | 4 | 0 |
|---|---|---|
| 19 | 91 | 28 |
| 13 | 81 | 20 |

| 0 | 4 | 0 |
|---|---|---|
| 12 | 88 | 38 |
| 7 | 78 | 29 |

| 0 | 4 | 0 |
|---|---|---|
| 7 | 81 | 50 |
| 3 | 72 | 39 |

| 0 | 3 | 1 |
|---|---|---|
| 3 | 73 | 62 |
| 1 | 62 | 51 |

These 10 filter kernels may be flipped left-to-right, top-to-bottom or on the diagonal to generate all the rest of the filters. In the case that the logic needed to do this is more expensive than simply storing all the 64 filters in a ROM, FIG. 14 lists a complete set of filter kernels for this example.

Figure 14:
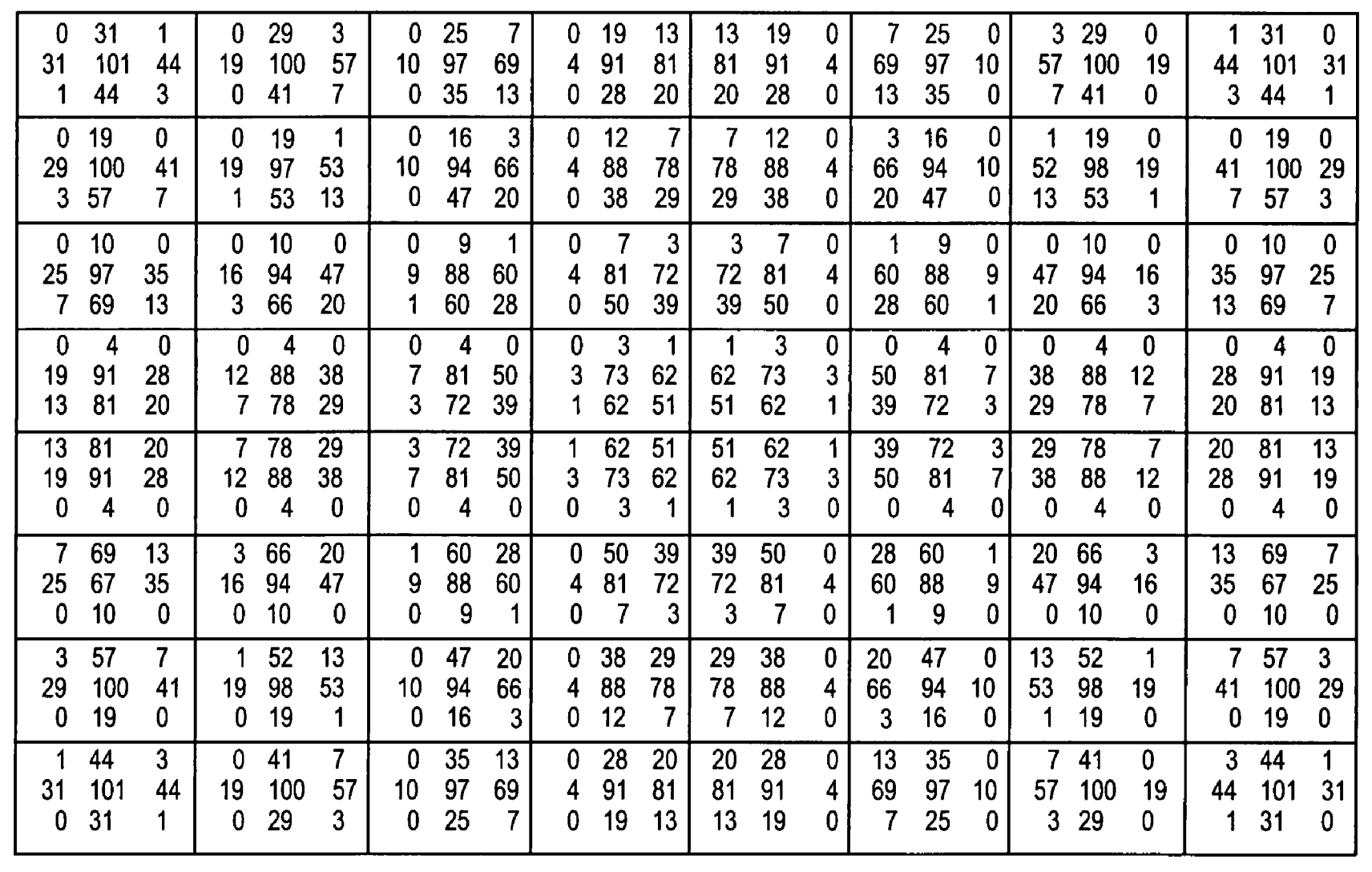

When stepping through the above table of FIG. 14, the next filter horizontally for each output pixel is employed, but it is possible to step through the input pixels in a slightly faster order by skipping one out of every 9 input addresses. It should be appreciated that the stepping rate may be either pre-calculated and stored to be used during image rendering or the stepping rate may be dynamically calculated during image rendering. For example, a digital differential analyzer (DDA) may be employed to generate such data. In the following Table 3, the input pixel number is the index to the center pixel for the filter kernel.

TABLE 3

| Output | 0 | 1 | 2 | 3 | 4 | 5 | 6 | 7 | 0 |
|---|---|---|---|---|---|---|---|---|---|
| Input | 0 | 1 | 2 | 3 | 5 | 6 | 7 | 8 | 9 |
| Delta | | 1 | 1 | 1 | 2 | 1 | 1 | 1 | 1 |

It should be noted that one extra step in this table is shown in Table 3—i.e. the first output pixel in the second repeat cell—which is wrapped back around to zero. The input pixel number in this column is shown as 9, which modulo 9 would wrap back around to zero in the second input repeat cell. The same step table is used vertically to choose which line to skip in the input.

It should be appreciated that the red/green checkerboard values may also be calculated using a number of other interpolation methods including bicubic or sinc function, and are envisioned within the scope of the present invention.

Table 4 below shows the filter kernels for blue scaling 9:8. As blue subpixels are very sparse (in some cases, there is only one for each repeating subpixel grouping), the scaling ratio in this case is actually 9:4, nine input pixels for each 4 output blue sub-pixels. Thus, there are only 16 filters without symmetries, although the symmetries should be apparent in the table. Some of these filters actually calculated out to be 3×4 filter kernels, but it is possible to drop the smallest rows and re-normalized them to sum to 256 again in these cases. Below is the resulting full repeat tell of filter kernels for blue:

TABLE 4

| 29 29 7 | 22 29 14 | 14 29 22 | 7 29 29 |
|---|---|---|---|
| 51 51 12 | 38 51 25 | 25 51 38 | 12 51 51 |
| 34 35 8 | 26 34 17 | 17 34 26 | 8 35 34 |
| 16 16 4 | 12 16 8 | 8 16 12 | 4 16 16 |
| 51 51 12 | 38 51 25 | 25 51 38 | 12 51 51 |
| 47 47 12 | 36 47 23 | 23 47 36 | 12 47 47 |
| 47 47 12 | 36 47 23 | 23 47 36 | 12 47 47 |
| 51 51 12 | 38 51 25 | 25 51 38 | 12 51 51 |

TABLE 4-continued

| | | | |
|---|---|---|---|
| 16 16 4 | 12 16 8 | 8 16 12 | 4 16 16 |
| 34 35 8 | 26 34 17 | 17 34 26 | 8 35 34 |
| 51 51 12 | 38 51 25 | 25 51 38 | 12 51 51 |
| 29 29 7 | 22 29 14 | 14 29 22 | 7 29 29 |

As the output pixels are traversed in order across a line, there are 9 input pixels or each 4 output blues, so it may be desirable to step rapidly through the input pixels. The input pixel index number in the Table 5 again indicates where the 3×3 filters are centered.

TABLE 5

| Output | 0 | 1 | 2 | 3 | 0 |
|---|---|---|---|---|---|
| Input pixel | 1 | 3 | 5 | 7 | 10 |
| Delta | | 2 | 2 | 2 | 3 |

It should be appreciated that there is one extra column in this table—to show that when the output pixel index steps into the first location of the next repeat cell, the input pixel value increases by 3 to 10, which modulo 9 is equal to the first value again.

For some subpixel layouts, the blue sub-pixel resample points may be oriented differently vertically than horizontally, so the vertical step table (Table 6) may also be different from the horizontal table:

TABLE 6

| Output | 0 | 1 | 2 | 3 | 0 |
|---|---|---|---|---|---|
| Input Row | 0 | 2 | 5 | 7 | 9 |
| Delta | | 2 | 3 | 2 | 2 |

Again, one extra column is included in this table to show that the input row increments by two when stepping into the next repeat cell, bringing the index up to 9, which, modulo 9 is equal to the first value again.

If treated in the "traditional" area-resampling way, the white sub-pixel would be filtered almost identically to the blue sub-pixels. This results, as can be seen for blue above, in large box filters that would blur the white information to an unacceptable degree. In such cases, it is possible to do a 4×4 cubic interpolation to get the values for white. Interpolating the white as the added benefit of reducing moiré distortion, since where the red and green subpixels may be reconstructing the signal on the shoulders of a peak or valley, the interpolated bright white subpixel will reconstruct the peak or valley.

As mentioned above, certain interpolations are separable—e.g. the Catmul-Rom cubic interpolation. Thus, it is possible to perform a one-dimensional horizontal cubic interpolation on each line as received, store these in line buffers, then perform a one-dimensional vertical cubic interpolation between 4 lines to generate the white values. In one embodiment, the horizontal cubic interpolation could employ 4 multipliers, and the vertical cubic interpolation could employ 4 multipliers, for a total of only 8.

In one embodiment, for each 9 input pixels, there are only 4 output white pixels, giving a scaling ratio of 9:4. Like scaling with area resampling, the horizontal cubic interpolation will have four different 4×1 filter kernels for all the positions across a repeat cell. Unlike scaling with area resampling, the horizontal cubic interpolation is identical on each line, so the table of filter coefficients is only one row and the same filters are used on each row of white pixels. These filter kernels are designed to be divided by 256.

TABLE 7

| | | | |
|---|---|---|---|
| −11 100 186 −19 | −2 23 247 −12 | −12 247 23 −2 | −19 186 100 −11 |

Usually, the stepping tables describe where the center of the filter kernel is designed to go, but cubic filters are always 4 across or 4 tall, with no center. Instead of showing the center, Table 8 shows the index in the step tables where the first coefficient is supposed to be aligned.

TABLE 8

| Output | 0 | 1 | 2 | 3 | 0 |
|---|---|---|---|---|---|
| Input pixel | −1 | 1 | 4 | 6 | 8 |
| Delta | | 2 | 3 | 2 | 2 |

On the first white output pixel with index 0, the index of the first input pixel would be −1, meaning that the filter "hangs off" the left edge of the screen by one input pixel. Table 8 shows an extra column with one step into the next repeat cell, so the next input pixel index can be seen. It should be noted that this one is equal to the first one modulo 9.

In the vertical direction (as shown in Table 9), the cubic scaling filters may land at different phase offsets, and a different filter kernel and step table may suffice as shown in Table 10.

TABLE 9

| −16 | −18 | −9 | −1 |
|---|---|---|---|
| 236 | 166 | 79 | 10 |
| 40 | 122 | 205 | 254 |
| −4 | −14 | −19 | −7 |

TABLE 10

| Output | 0 | 1 | 2 | 3 | 0 |
|---|---|---|---|---|---|
| Input Row | 0 | 2 | 4 | 6 | 9 |
| Delta | | 2 | 2 | 2 | 3 |

What is claimed is:

1. A method for converting source image data comprising one of a plurality of input image resolutions for display on a target image display panel comprising a plurality of subpixels further comprising a target image resolution, said source image data being reconstructed into a target image in said target image resolution for display onto said target image display panel using said target image display panel's subpixels for image reconstruction, the steps of said method comprising:

selecting a scaling factor, said scaling factor effecting a mapping of said source image data in one of said input image resolutions into said target image resolution of said target image display panel;

for said selected scaling factor, dividing the target image into a plurality of scaling repeat cells;

calculating a plurality of filter kernels; each filter kernel comprising coefficients calculated to implement cubic interpolation upon said source image data; each filter kernel, when applied to a portion of said source image data, scaling said portion of said source image data to at least one of said scaling repeat cells of said target image; and multiplying said source image data by said filter kernels to produce data values for said scaling repeat cells of said target image.

2. The method of claim 1 wherein said plurality of input resolutions comprise one of a group consisting of: NTSC, PAL, HDTV, and VGA.

3. The method of claim 1 wherein the target image display panel comprises 640×480 subpixel repeat cells.

4. The method of claim 3 wherein said target resolution is 1280×960.

5. The method of claim 1 wherein the target image display panel comprises 852×480 subpixel repeat cells.

6. The method of claim 5 wherein said target resolution is 1704×960.

7. The method of claim 1 wherein said scaling factor comprises the ratio of one of said input resolutions to said target resolution of said target image display panel.

8. The method of claim 7 wherein said scaling ratio is adjusted to change the size of the scaling repeat cell and the number of filter coefficients employed.

9. The method of claim 8 wherein the number of filter coefficients is reduced by said adjustment to said scaling ratio.

10. The method of claim 1 wherein said scaling factor is substantially 2×.

11. The method of claim 10 wherein said plurality of filter kernels comprise [−1/16 9/16 9/16 −1/16], the transpose of [−1/16 9/16 9/16 −1/16], and an array defined as

| 1 | −9 | −9 | 1 |
|---|----|----|---|
| −9 | 81 | 81 | −9 |
| −9 | 81 | 81 | −9 |
| 1 | −9 | −9 | 1. |

12. The method of claim 1 wherein said scaling factor is substantially 9:8.

13. The method of claim 1 wherein said scaling factor is substantially 9:4.

14. The method of claim 1 wherein the step of calculating a plurality of filter kernels further comprises calculating a plurality of filter kernels for each color plane.

15. The method of claim 14 wherein said plurality of filters kernels for one color plane is the same plurality for a second color plane.

16. The method of claim 1 wherein the step of multiplying said source image data by said filter kernels further comprises stepping through said source image data at a different rate than stepping through output pixel data.

17. The method of claim 16 wherein said input stepping rate is pre-calculated.

18. The method of claim 16 wherein said input stepping rate is dynamically calculated.

19. In an image processing system, said system receiving source image data with a first resolution and rendering said source image data into a rendered target image data for display on a display having a second subpixel resolution, a method for improving image quality in said rendered target image data, the steps of said method comprising:
interpolating said source image data to a substantially desired scaling factor;
applying cross-color sharpening to said interpolated source image data to produce said rendered target image data; and
displaying said rendered target image data on said display.

20. The method of claim 19 wherein said desired scaling factor is one of a group, said group comprising: 2× scaling, 9:8 scaling, and 9:4 scaling.

21. The method of claim 19 wherein said step of interpolation further comprises one of a group, said group comprising: cubic interpolation, bicubic interpolation, data duplication, linear interpolation, and area resampling.

22. The method of claim 19 wherein the step of applying cross-color sharpening further comprises:
applying a difference of gaussian wavelet filter; and
applying area resampling filter to said source image data.

23. The method of claim 19 wherein the steps of interpolating and applying cross-color sharpening further comprise:
convolving bicubic interpolation with area resampling filters; and
applying the convolution to said source image data.

24. A method for creating subpixel rendering polyphase filters, the steps of said method comprising:
generating a plurality of bicubic filter kernels;
convolving each of said bicubic filter kernels with a sharpened area resampling filter; and
adding the resulting values from each said convolution.

25. The method of claim 24 wherein the method further comprises the step of reducing the convolved filter kernel size.

26. The method of claim 25 wherein the step of reducing the convolved kernel size further comprises
setting small values at the edge of said kernel to zero; and
adding said small values to a nearby diagonal kernel.

27. The method of claim 25 wherein the step of reducing the convolved kernel size further comprises:
adjusting the interpolation grid location such that each of a plurality of kernels decreases in matrix dimensions.

28. The method of claim 24 wherein the method further comprises the step of
convolving the values of the blue subpixels taken at the red and green locations with a blue subpixel rendering filter.

29. The method of claim 28 wherein said blue subpixel rendering filter comprises one of a group, said group comprising; a 1×2 box filter, a 2×2 box filter and a 1×3 tent filter.

30. In an image processing system comprising a display panel having an eight subpixel repeating group, said repeating group further comprising four green subpixels, two red subpixels and two blue subpixels; a method for improving image quality on source image data, the steps of said method comprising:
mapping one source input pixel to one green subpixel;
interpolating intermediate reconstruction points at the red and blue subpixels wherein further the red and blue subpixels are filtered with a 4×1 filter.

31. The method of claim 30 wherein said 4×1 filter comprises [−1/16, 9/16, 9/16, −1/16].

32. The method of claim 30 wherein said red and blue subpixels are displaced from said green subpixels.

33. The method of claim 32 wherein said method further comprises filtering the red and the blue subpixels with a 2×2 box filter.

34. The method of claim 33 wherein said 2×2 box filter further comprises:

| 1/4 | 1/4 |
|-----|-----|
| 1/4 | 1/4. |

35. The method of claim 32 wherein said method further comprises filtering the red and the blue subpixels with a 4×4 box-cubic filter.

36. In a display system comprising a display, said display further comprising a plurality of subpixels and wherein further said display system accepts source image data, said source image data further comprising at least a first color image data and a second color image data,
- a method of performing subpixel rendering on source image data onto said display, the steps of said method comprising:
- inputting said source image data;
- performing a difference of Gaussian filter upon said first color image data;
- performing an area resampling filter upon said second color image data; and
- combining the results of both difference of Gaussian and area resampling filters to render output color image data onto said display.

37. The method of claim 36 wherein said first color image data is green image data.

38. The method of claim 37 wherein said second color image data is red image data.

39. The method of claim 36 wherein said step of inputting source image data further comprises:
- interpolating said source image data from a first resolution to a second resolution related to the number of subpixels on said display.

40. The method of claim 36 wherein the steps of performing a difference of Gaussian filter upon said first color image data and performing an area resampling filter upon said second color image data further comprises:
- applying a convolution of both said difference of Gaussian filter and said area resampling filter.

41. The method of claim 39 wherein the steps of inputting source image data, performing a difference of Gaussian filter upon said first color image data and performing an area resampling filter upon said second color image data further comprises:
- applying a convolution of said interpolation filter, said difference of Gaussian filter and said area resampling filter.

* * * * *